[12] United States Patent  (10) Patent No.: US 9,288,381 B2
Irie et al.  (45) Date of Patent: Mar. 15, 2016

(54) IN-VEHICLE IMAGE RECOGNIZER

(71) Applicants: CLARION CO., LTD., Saitama-shi, Saitama (JP); NISSAN MOTOR CO., LTD., Yokohama-shi, Kanagawa (JP)

(72) Inventors: Kota Irie, Saitama (JP); Masayuki Takemura, Hitachi (JP); Shoji Muramatsu, Hitachi (JP); Yasuhisa Hayakawa, Yokohama (JP); Osamu Fukata, Commerce Township, MI (US); Masahiro Kiyohara, Tokyo (JP); Akira Utagawa, Hitachi (JP)

(73) Assignees: CLARION CO., LTD., Saitama-shi (JP); NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 14/416,851

(22) PCT Filed: Jul. 19, 2013

(86) PCT No.: PCT/JP2013/069667
§ 371 (c)(1),
(2) Date: Jan. 23, 2015

(87) PCT Pub. No.: WO2014/017403
PCT Pub. Date: Jan. 30, 2014

(65) Prior Publication Data
US 2015/0201120 A1 Jul. 16, 2015

(30) Foreign Application Priority Data

Jul. 27, 2012 (JP) .................................. 2012-167702

(51) Int. Cl.
*H04N 7/12* (2006.01)
*H04N 11/02* (2006.01)
(Continued)

(52) U.S. Cl.
CPC ............ *H04N 5/23212* (2013.01); *B60R 1/002* (2013.01); *G02B 27/0006* (2013.01);
(Continued)

(58) Field of Classification Search
None
See application file for complete search history.

(56) References Cited

U.S. PATENT DOCUMENTS 4,900,140 A * 2/1990 Okamura ................ B60R 1/002
248/467
6,134,342 A * 10/2000 Doke ................ G01M 11/0278
356/124

(Continued)

FOREIGN PATENT DOCUMENTS

JP 2001-052185 A 2/2001
JP 2003-044863 A 2/2003

(Continued)

*Primary Examiner* — Joseph Ustaris
*Assistant Examiner* — Talha Nawaz
(74) *Attorney, Agent, or Firm* — Foley & Lardner LLP

(57) ABSTRACT

An in-vehicle image recognizer effectively detects a moving object from an image even when a lens has grime. In a detection sensitivity adjustor (50) which adjusts detection sensitivity to be increased according to a white turbidity level (U), the detection sensitivity of a vehicle detector (70) (image recognition application execution unit), which detects the other vehicle (6) (moving object) existing in the surrounding area of a vehicle (5) with a predetermined detection sensitivity from the image obtained by an imaging unit (10) disposed in the vehicle (5) to observe the surrounding area of the vehicle (5) through a lens (12) and convert the light signal of the observed surrounding area of the vehicle (5) into an image signal, is corrected based on the attachment level M of the attached matter such as dirt or water drops to the lens (12), which is calculated by an attachment level calculator (26).

7 Claims, 26 Drawing Sheets

(51) Int. Cl.
*H04N 11/04* (2006.01)
*H04N 5/232* (2006.01)
*H04N 5/217* (2011.01)
*H04N 5/357* (2011.01)
*G06K 9/00* (2006.01)
*G06T 7/00* (2006.01)
*G06T 7/20* (2006.01)
*G08G 1/16* (2006.01)
*H04N 5/225* (2006.01)
*B60R 1/00* (2006.01)
*G02B 27/00* (2006.01)

(52) U.S. Cl.
CPC ........ *G06K9/00798* (2013.01); *G06K 9/00825* (2013.01); *G06T 7/0042* (2013.01); *G06T 7/2053* (2013.01); *G08G 1/16* (2013.01); *G08G 1/166* (2013.01); *G08G 1/167* (2013.01); *H04N 5/2171* (2013.01); *H04N 5/225* (2013.01); *H04N 5/232* (2013.01); *H04N 5/3572* (2013.01); *G06T 2207/10016* (2013.01); *G06T 2207/20224* (2013.01); *G06T 2207/30261* (2013.01)

(56) References Cited

U.S. PATENT DOCUMENTS

| | | | | |
|---|---|---|---|---|
| 2004/0263673 | A1* | 12/2004 | Kikuchi | H04N 5/23206 348/345 |
| 2014/0009615 | A1* | 1/2014 | Kiyohara | H04N 7/18 348/148 |
| 2015/0172582 | A1* | 6/2015 | Kiyohara | G06K 9/00791 348/322 |

FOREIGN PATENT DOCUMENTS

| | | | |
|---|---|---|---|
| JP | 2004-153422 | A | 5/2004 |
| JP | 2007-318355 | A | 12/2007 |
| JP | 2012-38048 | A | 2/2012 |

* cited by examiner

FIG.10
(A)
(B)
(C)
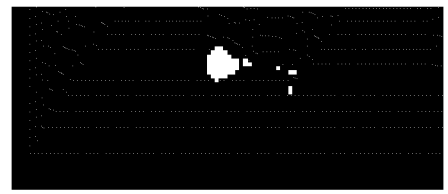
(D)
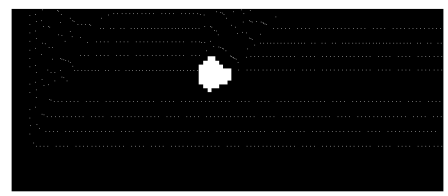

FIG.12
(A)
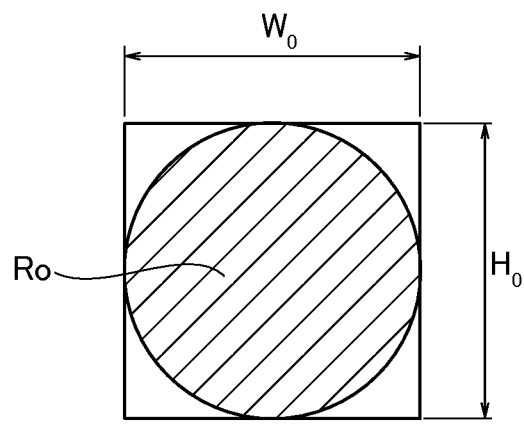
(B)
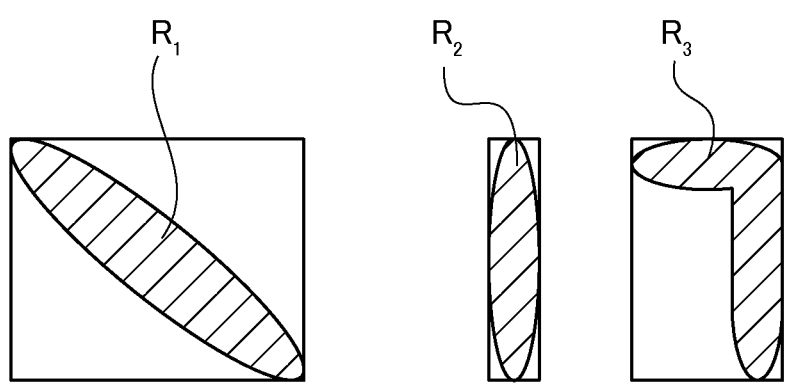

FIG.24
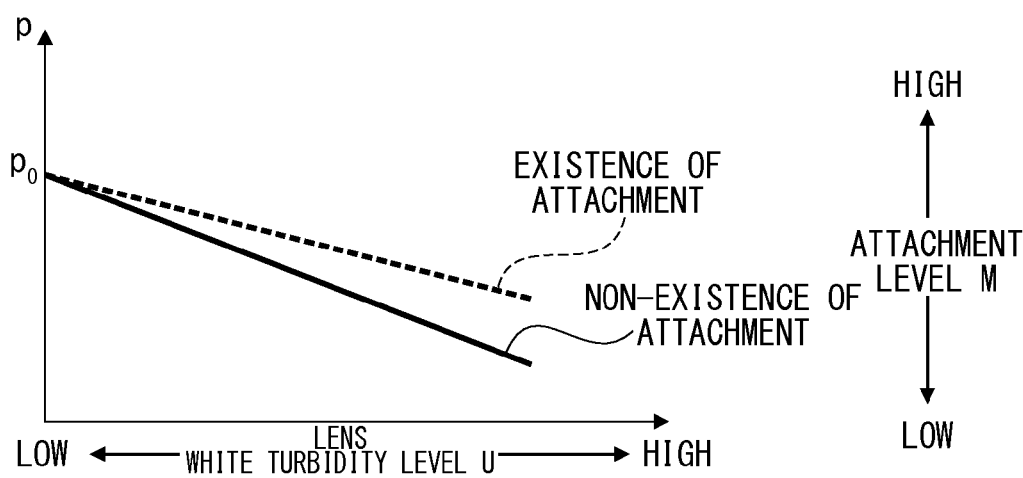
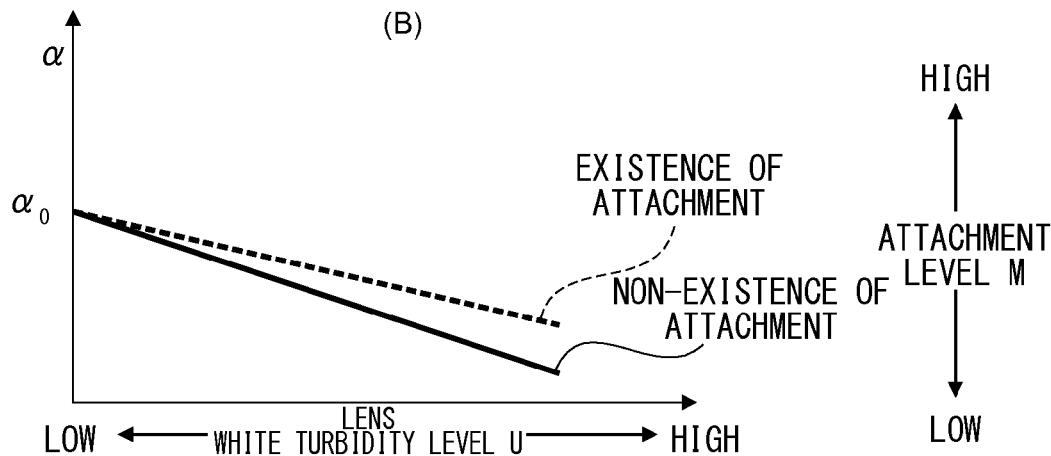

(A)   (B)

(A)   (B)

FIG.30
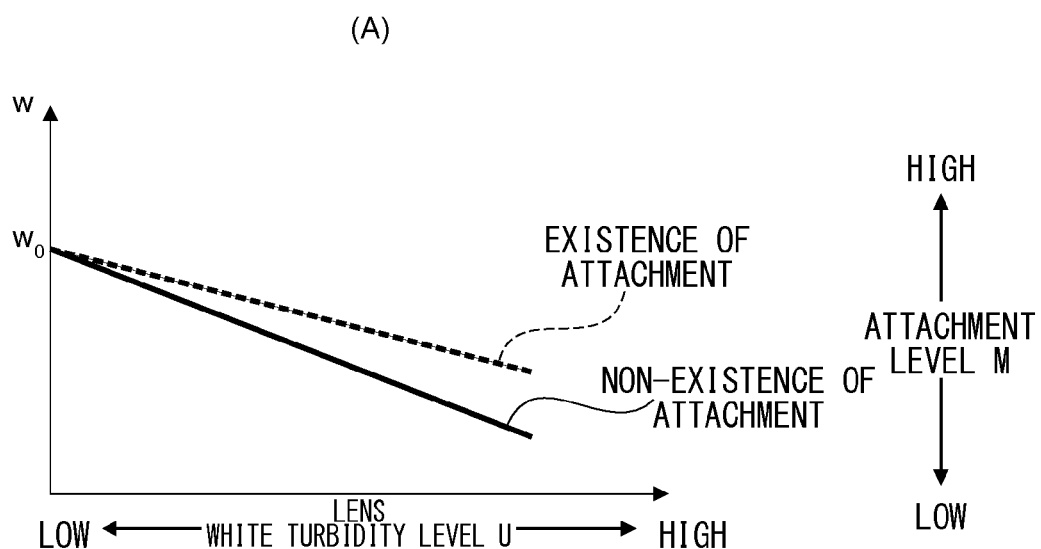
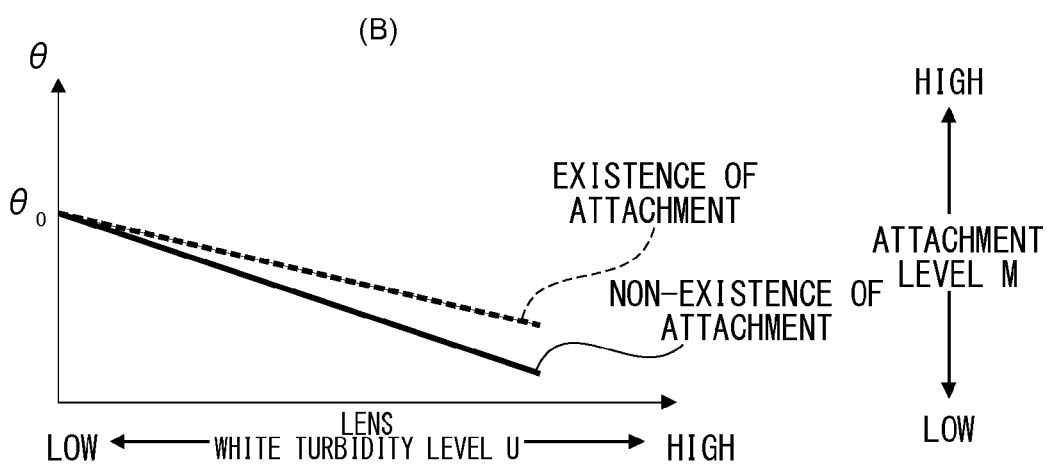

IN-VEHICLE IMAGE RECOGNIZER

TECHNICAL FIELD

The present invention relates to an in-vehicle image recognizer which detects a position of another vehicle, a position of a lane marker, or the like by a vehicle-mounted camera.

BACKGROUND ART

Recently, an in-vehicle image recognizer has been in practical use. Such an in-vehicle image recognizer observes a surrounding area of a vehicle by a vehicle-mounted camera, detects a position of another vehicle, a position of a lane marker, or the like from the observed image, and determines the possibility of contact with another vehicle or the possibility of lane departure based on the detected position of another vehicle or the detected position of the lane marker, so as to alert a driver.

In such a system, while a vehicle is traveling in rain, water splashed by a vehicle may be attached to the lens surface of the camera. Also, while a vehicle is traveling on a dirt road, dust stirred up by the vehicle may be attached to the lens surface of the camera. Further, while a vehicle is traveling on a road on which a snow-melting agent is spread, the snow-melting agent splashed by the vehicle may be attached to the lens surface of the camera. These substances attached as described above are dried, and impurities in water, dust, or snow-melting agent are deposited, and accumulate on the lens surface to cause grime (hereinafter, white turbidity) on the lens surface.

When a white turbidity part is generated on the lens surface, light entering the lens is scattered at the white turbidity part and therefore blurring or bleeding occurs in the observed image. Since the contrast of the image of another vehicle or the lane marker which is a detection target is lowered due to such blurring or bleeding, lack of detection or false detection of another vehicle or a lane marker may occur. Due to the occurrence of lack of detection or false detection, an appropriate alert regarding the position of another vehicle or the position of the lane marker may not be provided to a driver.

In a system in which a crew in a vehicle cannot visibly recognize an image obtained by a camera, the crew cannot confirm that a lens has a white turbidity part, and the above-described lack of detection or false detection therefore gives the crew a sense of uncertainty with the system.

In order to prevent such lack of detection or false detection, for example, an obstacle detector for a vehicle is disclosed (for example, Patent Literature 1).

CITATION LIST

Patent Literature

Patent Literature 1: JP 2012-38048A

SUMMARY OF THE INVENTION

Problem to Solution

In the obstacle detector for a vehicle described in Patent Literature 1, foreign substances attached to a lens of a camera are detected as an unmoved region whose position is not temporarily changed, and the detected unmoved region is excluded from a detection target of an obstacle, so as to improve the accuracy of the obstacle detection.

However, it is difficult to detect an obstacle such as water having high permeability, which is attached to a lens, as the unmoved region.

Moreover, when a region where substances are attached to a lens is expanded, a region which executes the detection of the obstacle is narrowed, resulting in deterioration in obstacle detection performance.

The present invention has been made in view of the above problems, and an object of the present invention is to provide an in-vehicle image recognizer which can reliably detect a position of another vehicle or a position of a lane marker even when a white turbidity part is generated on a lens or attached matter is attached to a lens.

Solution to Problem

The in-vehicle image recognizer according to the present invention relates to an in-vehicle image recognizer which can detect a position of another vehicle or a position of a lane marker even when white turbidity occurs on a lens or an attached matter such as dirt or water drops is attached to the lens.

More specifically, an in-vehicle image recognizer according to Claim 1 of the present invention includes an imaging unit which is disposed in a vehicle to observe a surrounding area of the vehicle through a lens, and convert a light signal of the observed surrounding area of the vehicle into an image signal, an image recognition application execution unit having predetermined detection sensitivity to detect a moving object existing in the surrounding area of the vehicle from the image obtained by the imaging unit, a white turbidity level calculator which calculates a white turbidity level of the lens from the image signal, an attachment level calculator which calculates an attachment level of attached matter such as dirt or water drops to the lens, and a detection sensitivity adjustor which adjusts the detection sensitivity to be increased according to the white turbidity level, wherein the detection sensitivity adjustor corrects the detection sensitivity based on the attachment level of the attached matter such as the dirt or the water drops to the lens.

According to the in-vehicle image recognizer set forth in Claim 1 of the present invention, in the detection sensitivity adjustor which adjusts the detection sensitivity to be increased according to the white turbidity level, the detection sensitivity of the image recognition application execution unit, which detects a moving object existing in the surrounding area of the vehicle with a predetermined detection sensitivity from the image obtained by the imaging unit disposed in the vehicle to observe the surrounding area of the vehicle through a lens and convert the light signal of the observed surrounding area of the vehicle into the image signal, is corrected based on the attachment level of the attached matter such as dirt or water drops to the lens, which is calculated by the attachment level calculator. With this configuration, even when the attached matter such as dirt or water drops is attached to the lens, an excessive increase in detection sensitivity is controlled, and thus, the moving object existing in the surrounding area of the vehicle can be effectively detected.

Advantageous Effects of the Invention

According to the in-vehicle image recognizer of the present invention, the position of another vehicle or the position of a lane marker can be effectively detected regardless of an attachment condition of attached matter or white turbidity level to a lens.

BRIEF DESCRIPTION OF THE DRAWINGS

FIG. 8(A) illustrates an example of an image obtained in a condition without white turbidity and an example of a brightness distribution in the image, and FIG. 8(B) illustrates an example of an image obtained in a condition with white turbidity and an example of a brightness distribution in the image.

FIGS. 10(A) to 10(D) are views illustrating an example of a light source region detection process in Embodiment 1 of the present invention, FIG. 10(A) illustrates an obtained image, FIG. 10(B) illustrates an image obtained by minifying the obtained image, FIG. 10(C) illustrates an image obtained by binarizing the image in FIG. 10(B) and an image to which a labeling process is executed, and FIG. 10(D) illustrates a detection result of a light source region satisfying a condition from the image in FIG. 10(C).

FIGS. 12(A) and 12(B) are views illustrating shapes of a region which is detected in the light source region detection process for calculating a white turbidity level, FIG. 12(A) illustrates an example of a shape of the light source region to be detected, and FIG. 12(B) illustrates examples of shapes not to be detected.

FIG. 20(A) is a plan view illustrating moving vehicles, and FIG. 20(B) is a view briefly describing the alignment.

FIG. 21(A) is a view describing a method of generating a difference waveform from a difference result of the viewpoint conversion image, and FIG. 21(B) is a view illustrating an example of the generated difference waveform.

FIGS. 24(A) and 24(B) are views illustrating a method of correcting a threshold of a vehicle detection process according to a grime level of a lens.

FIGS. 26(A) and 26(*b*) are views describing three-dimensional object detection based on edge information, FIG. 26(A) is a plan view illustrating a positional relationship of a detection region, and FIG. 26(B) is a perspective view illustrating a positional relationship of a detection region in a real space.

FIG. 27(A) is a view illustrating a positional relationship among an attention line, reference line, attention point, and reference point in a viewpoint conversion image, and FIG. 27(B) is a view illustrating a positional relationship among an attention line, reference line, attention point, and reference point in a real space.

FIG. 28(A) is a view illustrating a detection region in a viewpoint conversion image, and FIG. 28(B) is a view illustrating a positional relationship among an attention line, reference line, attention point, and reference point in a viewpoint conversion image.

FIG. 29(A) is a view illustrating a brightness distribution when a three-dimensional object (vehicle) exists in a detection region, and FIG. 29(B) is a view illustrating a brightness distribution when a three-dimensional object does not exist in a detection region.

FIGS. 30(A) and 30(B) are other views illustrating a method of correcting a threshold of a vehicle detection process according to a grime level of a lens.

DESCRIPTION OF EMBODIMENT

Hereinafter, an embodiment of an in-vehicle image recognizer according to the present invention will be described with reference to the drawings. In the following description, a gray value stored in an image is referred to as a brightness value.

Embodiment 1

The present embodiment is an example in which an in-vehicle image recognizer of the present invention is installed in a vehicle including a BSW system (image recognition application) which monitors a backward of a vehicle while the vehicle is traveling, and alerts a driver when a close vehicle travels in a close lane in the backward of the vehicle.

At first, the operation of the BSW system will be described with reference to FIG. 1. An imaging unit 10 which monitors a backward of a vehicle 5 is attached backside-to the rear part of the vehicle 5. The imaging unit 10 images a range ω including right and left close lanes in the backward of the vehicle 5 (range including lanes $Y_1, Y_2, Y_3$ of road 2). A close vehicle in a detection region X1 in the lane $Y_1$ and a close vehicle in a detention region X2 on the lane $Y_3$ close to each other are detected from the obtained image by an image process.

The BSW system is activated while the vehicle 5 is traveling at a predetermined speed or more. The BSW system recognizes the other vehicle 6 as a close vehicle when the other vehicle 6 is detected in the lanes $Y_1, Y_3$ close to the lane $Y_2$ within a predetermined distance range from the imaging unit 10, and it is confirmed that the other detected vehicle 6 is close to the vehicle 5.

It is determined that the other vehicle 6 is close to the vehicle 5 based on the time-series analysis of the image obtained by the imaging unit 10. The details of such determination will be described later.

When it is recognized that the other vehicle 6 is close to the vehicle 5, the existence of the other vehicle 6 is informed to a driver as visual information by lighting on an indicator provided in the vehicle 5, for example (first warning).

When a driver tries to change the lane to the lane $Y_1$ in which the other vehicle 6 exists with a blinker without being aware of the visual information, the BSW system more clearly informs the driver the existence of the other vehicle 6 by lighting on the indicator and activating alarm (second warning), so as to interrupt the lane change.

Figure 2:
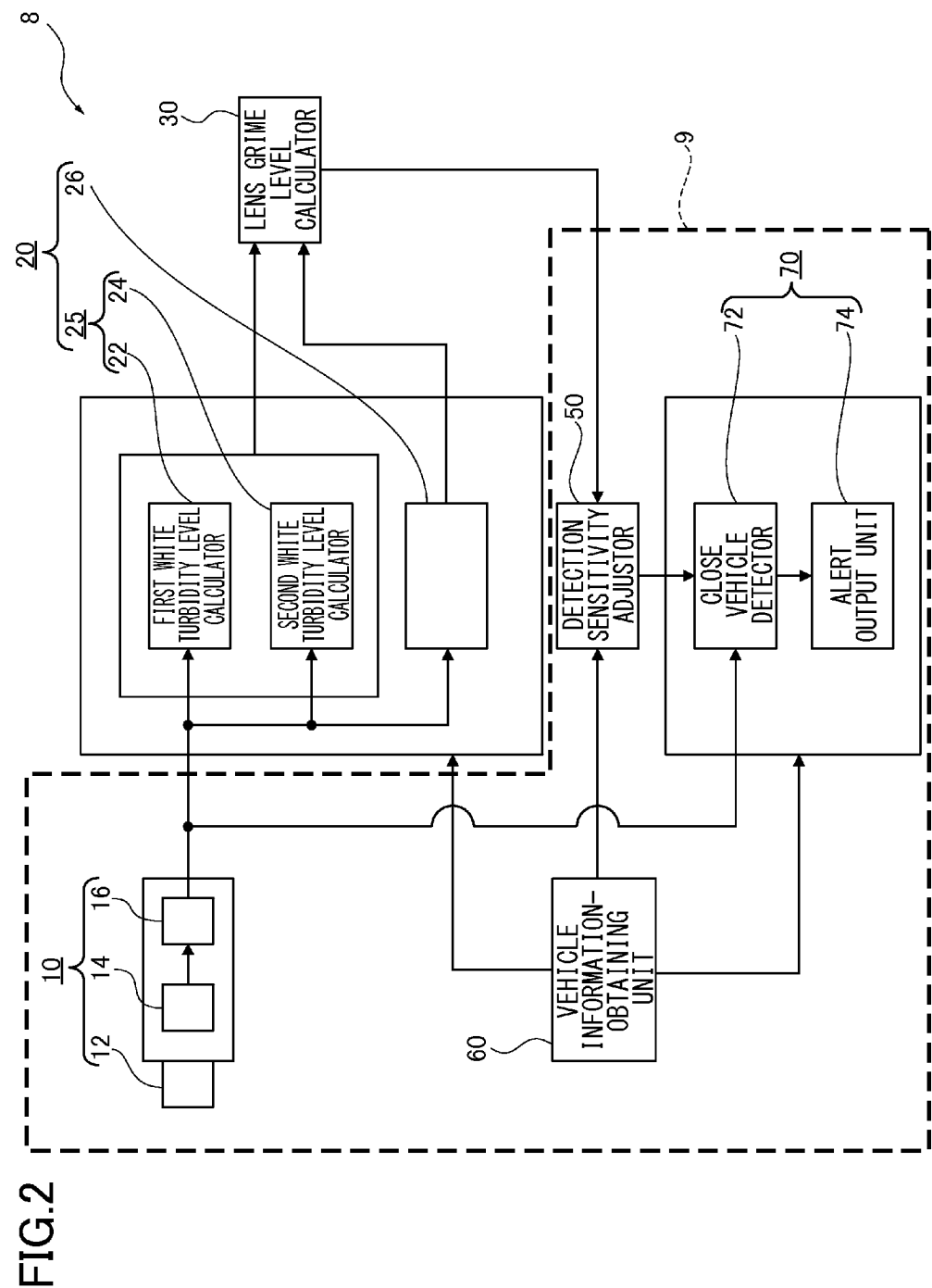
FIG. 2 is a block diagram illustrating a schematic configuration of an in-vehicle image recognizer according to Embodiment 1 of the present invention.

Next, the configuration of the in-vehicle image recognizer according to Embodiment 1 will be described with reference to FIG. 2. FIG. 2 illustrates a configuration view in which the in-vehicle image recognizer according to the present embodiment is installed in the vehicle 5 including the BSW system.

Figure 1:
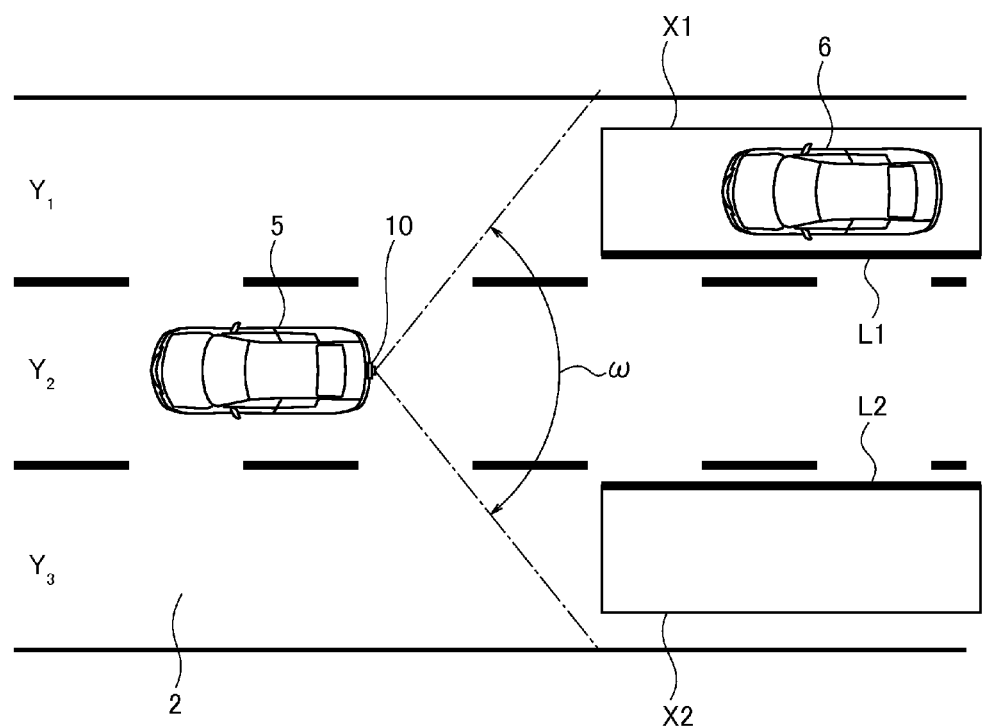
FIG. 1 is a view describing a BSW (Blind Spot Warning) system as one example of an in-vehicle system on which an in-vehicle image recognizer according to the present invention is installed.

As illustrated in FIG. 2, the in-vehicle image recognizer 8 according to Embodiment 1 includes the imaging unit 10 which is disposed near the back license plate of the vehicle 5 (refer to FIG. 1) to monitor a range co illustrated in FIG. 1, a lens grime detector 20 which detects an attachment level of attached matter such as dirt or water drops and a white turbidity level of a lens 12 mounted on the front part of the imaging unit 10 from the image obtained by the imaging unit 10, a lens grime level calculator 30 which calculates a grime level of the lens 12 based on the detected attachment level of the attached matter such as dirt or water drops and the detected white turbidity level of the lens 12, a detection sensitivity adjustor 50 which adjusts a detection sensitivity of the other vehicle 6 in the after-described vehicle detector 70, a vehicle information-obtaining unit 60 which obtains a vehicle speed of the vehicle 5, and a vehicle detector 70 (image recognition application execution unit) which detects the other vehicle 6 coming closer to the vehicle 5 from the backward of the vehicle 5.

The imaging unit 10, detection sensitivity adjustor 50, vehicle information-obtaining unit 60, and vehicle detector 70 constitute a BSW system 9.

The imaging unit 10 includes the lens 12, a photoelectrical convertor 14 made of a CMOS element, for example to photoelectrically convert a light signal into an electric signal, and a gain adjuster 16 which adjusts the gain of the photoelectrically converted electric signal.

The lens grime detector 20 includes a white turbidity level calculator 25 having a first white turbidity level calculator 22 which calculates a white turbidity level of the lens 12 based on a brightness gradient in the image obtained by the imaging unit 10 and a second white turbidity level calculator 24 which calculates a white turbidity level of the lens 12 based on dispersion of a brightness value in the image obtained by the imaging unit 10, and an attached matter level calculator 26 which detects attached matter such as dirt or water drops attached to the lens 12.

The vehicle detector 70 includes a close vehicle detector 72 which detects a three-dimensional object in the backward of the vehicle 5 from the image obtained by the imaging unit 10, and calculates a moving distance and a moving speed of the three-dimensional object to detect the three-dimensional object as a close vehicle, and an alert output unit 74 which alerts a driver with an indicator or a buzzer when the close vehicle is detected in the close vehicle detector 72.

Next, the detailed configuration of the lens grime detector 20 will be described with reference to FIGS. 3 to 5.

Figure 3:
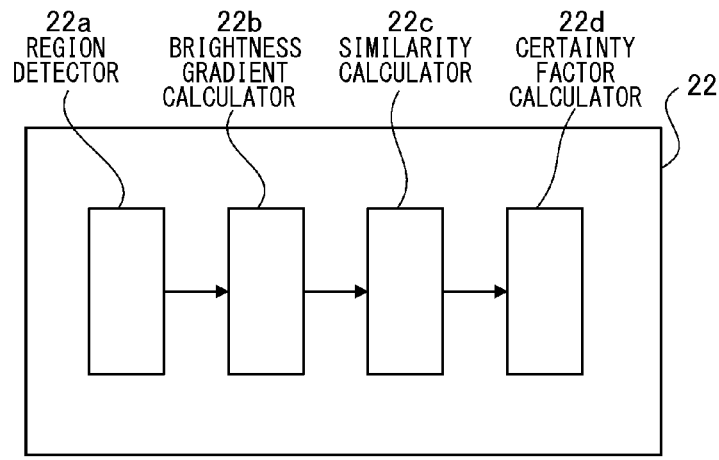
FIG. 3 is a block diagram illustrating a detailed configuration of a first white turbidity level calculator of the present invention.

As illustrated in FIG. 3, the first white turbidity level calculator 22 which constitutes the white turbidity level calculator 25 includes a region detector 22a which detects an image of a headlight of a following vehicle, a brightness gradient calculator 22b which calculates brightness gradient on a predetermined line in a region detected in the region detector 22a, a similarity calculator 22c which determines whether or not regions detected in the region detector 22a in different times are images by the same light source, and a certainty factor determination unit 22d which determines a certainty factor of the calculated white turbidity level.

Figure 4:
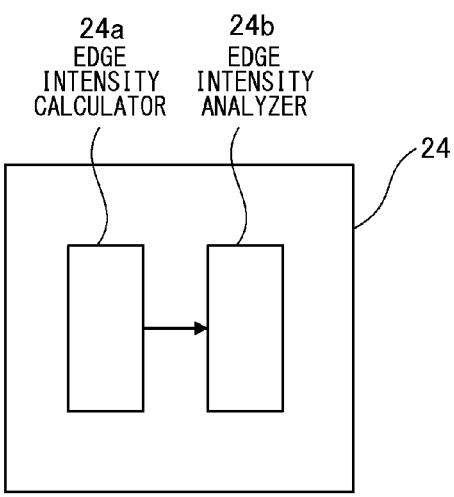
FIG. 4 is a block diagram illustrating a detailed configuration of a second white turbidity level calculator of the present invention.

As illustrated in FIG. 4, the second white turbidity level calculator 24 of the white turbidity level calculator 25 includes an edge intensity calculator 24a which calculates edge intensity of the image obtained by the imaging unit 10, and an edge intensity analyzer 24b which obtains a distribution of edge intensity of an image from the edge intensity calculated in the edge intensity calculator 24a, and calculates the white turbidity level of the lens 12 based on the distribution of the edge intensity of the image.

Figure 5:
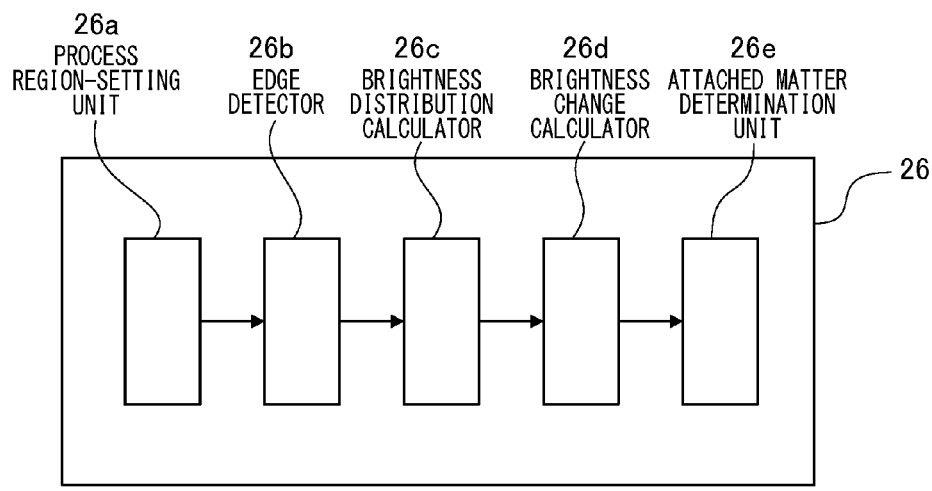
FIG. 5 is a block diagram illustrating a detailed configuration of an attached matter level calculator of the present invention.

As illustrated in FIG. 5, the attached matter level calculator 26 includes a process region-setting unit 26a which sets a process region in the image obtained by the imaging unit 10, and divides the process region into a plurality of blocks, an edge detector 26b which detects a region having weak edge intensity from the image, a brightness distribution calculator 26c which obtains a brightness value in the weak edge intensity region and the peripheral region, and calculates a brightness distribution, a brightness change calculator 26d which calculates a time-series change in brightness value based on the brightness value accumulated in time series, and an attached matter determination unit 26e which determines the existence or non-existence of the attached matter of the lens 12 based on the process results of the edge detector 26b, the brightness distribution calculator 26c, and the brightness change calculator 26d.

Next, the detailed configuration of the close vehicle detector 72 of the vehicle detector 70 will be described with reference to FIG. 6.

Figure 6:
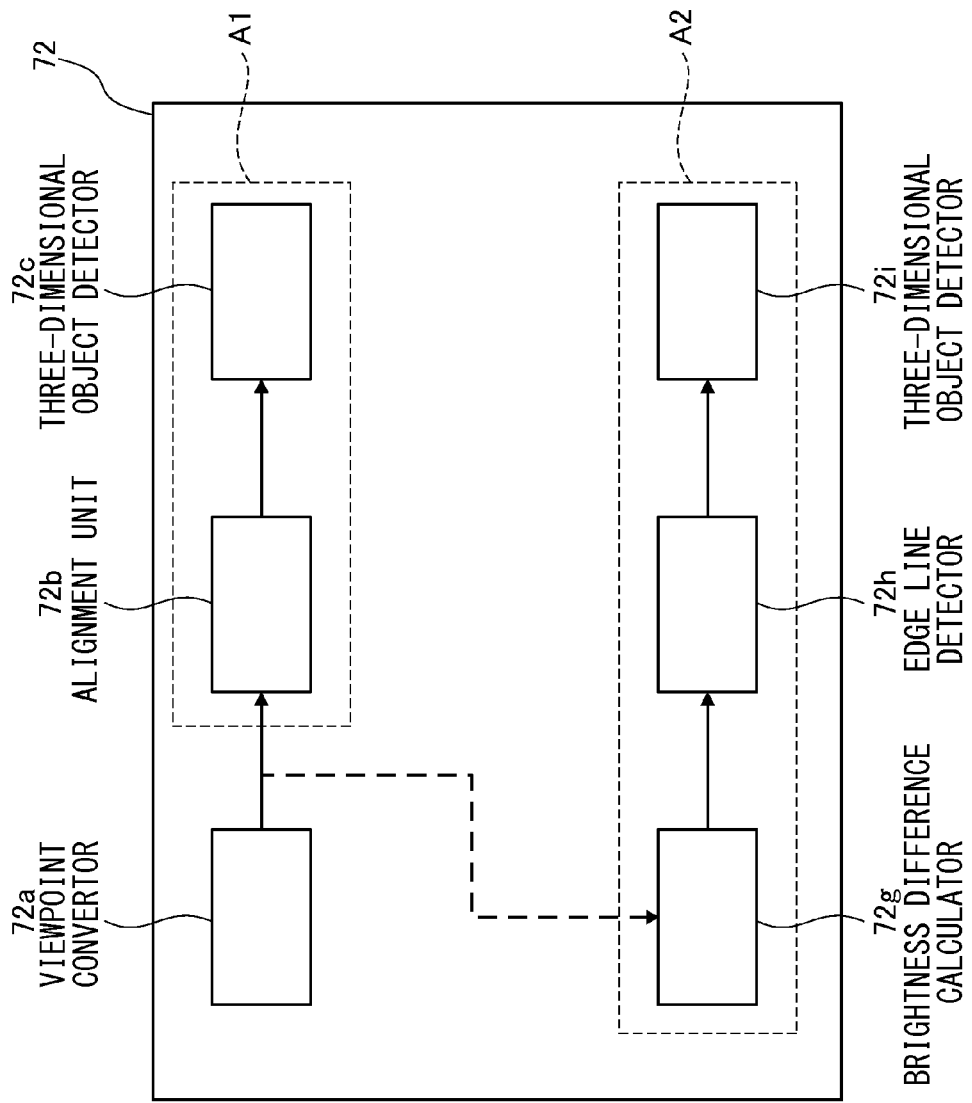
FIG. 6 is a block diagram illustrating a detailed configuration of a close vehicle detector of the present invention.

The close vehicle detector 72 illustrated in FIG. 6 detects a close vehicle (the other vehicle 6) with the use of difference waveform information, and includes a viewpoint convertor 72a, an alignment unit 72b, and a three-dimensional object detector 72c.

In addition, the close vehicle detector 72 of Embodiment 1 may detect a close vehicle (the other vehicle 6) with the use of edge information. In this case, as illustrated in FIG. 6, a detection block A1 including the alignment unit 72b and the three-dimensional object detector 72c is substituted with a detection block A2 including a brightness difference calculator 72g, an edge line detector 72h, and a three-dimensional object detector 72i, which are surrounded by the dashed line.

The close vehicle detector 72 may include both of the detection block A1 and the detection block A2 to detect a close vehicle with the use of the difference waveform information and detect a close vehicle with the use of the edge information. When the close vehicle detector 72 includes both of the detection block A1 and the detection block A2, any one of the detection block A1 and the detection block A2 may be operated according to an environmental factor such as brightness.

Next, the flow of a sequence of operations of the in-vehicle image recognizer 8 according to Embodiment 1 will be described with reference to the flowchart of FIG. 7.

At first, in Step S1, a vehicle speed is obtained as vehicle information of the vehicle 5 in the vehicle information-obtaining unit 60.

Next, in Step S2, it is determined whether or not a value of a vehicle speed signal obtained in the vehicle information-obtaining unit 60 is a predetermined value (for example, 1 km/h) or more. When the value of the vehicle speed signal is a predetermined value or more, the process moves to Step S3 to initiate the BSW system 9. On the other hand, when a vehicle speed is less than a predetermined value, the process returns to Step S1.

Next, in Step S4, an image of a backward of the vehicle 5 is obtained by the imaging unit 10. The light signal transmitting the lens 12 is converted into an electric signal in the photoelectric convertor 14, and the electric signal is amplified in the gain adjuster 16 to generate an image signal I (x, y). Hereinafter, the image signal I (x, y) is simply referred to as the image I (x, y).

The gain adjustor 16 provides an appropriate gain to amplify the electric signal, such that the electric signal converted in the photoelectric convertor 14 has a predetermined level, and generates the image I (x, y). The image I (x, y) having a high SN ratio is thereby obtained due to the appropriate gain even when the image is obtained under a dark environment. In addition, the gain adjustment is executed as needed along with imaging, and the latest gain value can be monitored in the gain adjustor 16.

Figure 8:
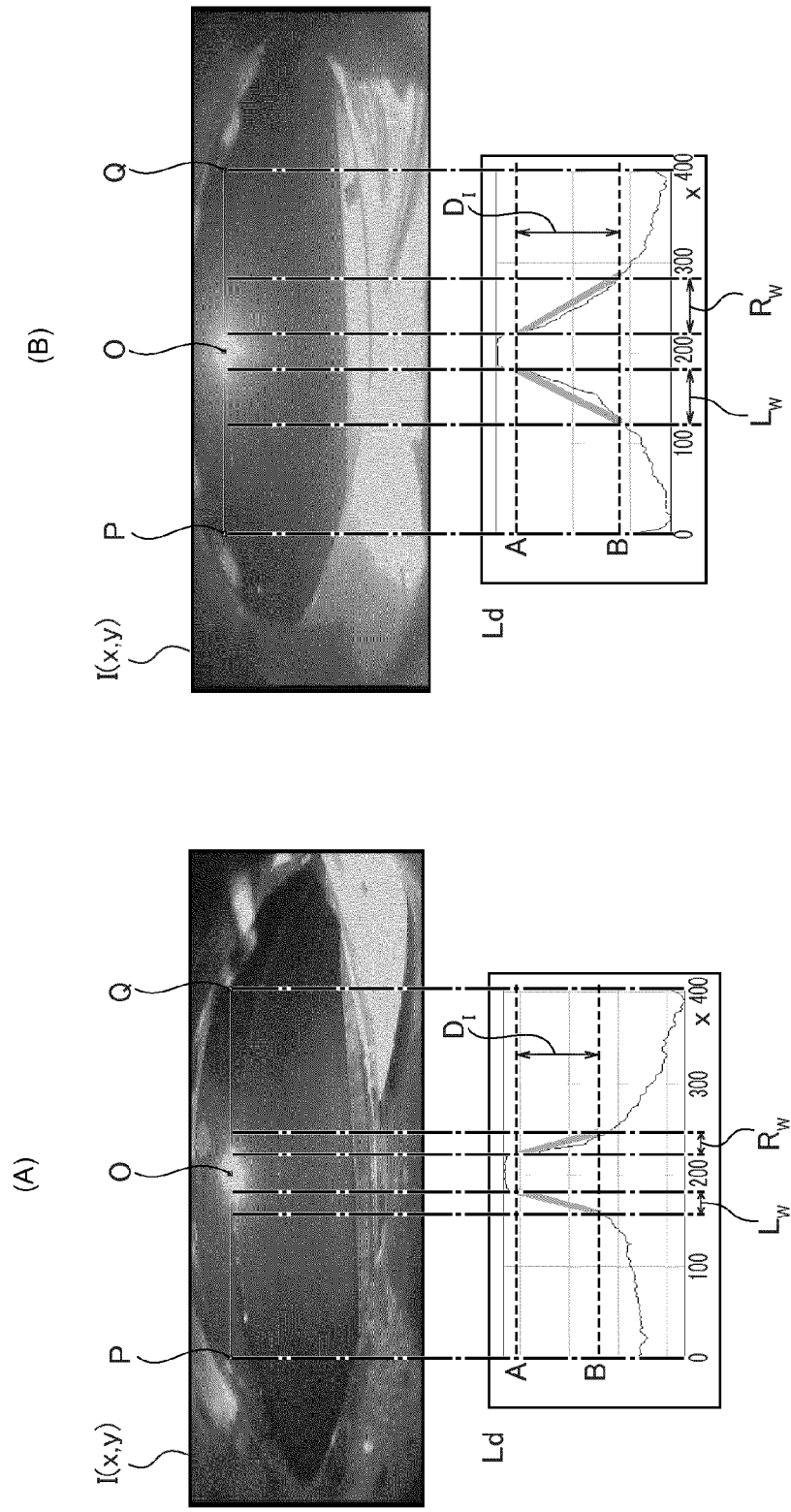
FIGS. 8(A) and 8(B) are views describing a situation where white turbidity is generated on a lens.
Figure 9:
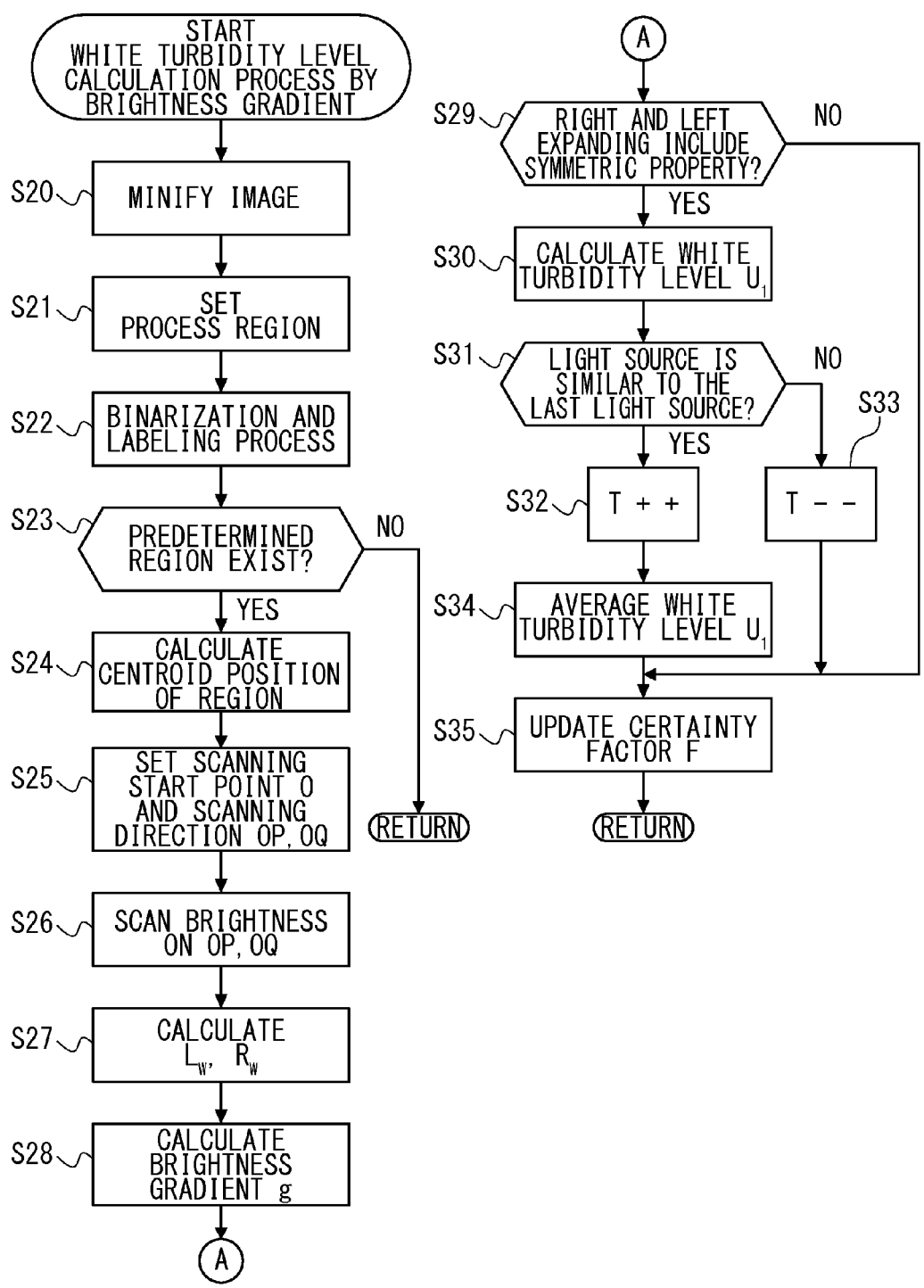
FIG. 9 is a flowchart illustrating a flow of a white turbidity level calculation process based on a brightness gradient, which is executed in Embodiment 1 of the present invention.

Next, in Step S5, the white turbidity level of the lens 12 is calculated in the first white turbidity level calculator 22 and the second white turbidity level calculator 24. The procedure of this process is illustrated in FIGS. 8, 9, and the details of the process will be described later.

Then, in Step S6, the attached matter such as dirt or water drops attached to the lens 12 is detected in the attachment level calculator 26. The procedure of this process is illustrated in FIG. 10, and the details of the process will be described later.

Next, in Step S7, the grime level of the lens 12 is calculated in the lens grime level calculator 30. The details of this process will be described later.

In Step S8, the white turbidity level of the lens 12 calculated in the first and second white turbidity level calculators 22, 24 and the attachment level of the attached matter such as dirt or water drops attached to the lens 12 calculated in the attached matter level calculator 26 are informed to the detection sensitivity adjustor 50, and the vehicle detection sensitivity is corrected based on the informed white turbidity and attached matter levels of the lens 12 in the detection sensitivity adjustor 50.

Figure 25:
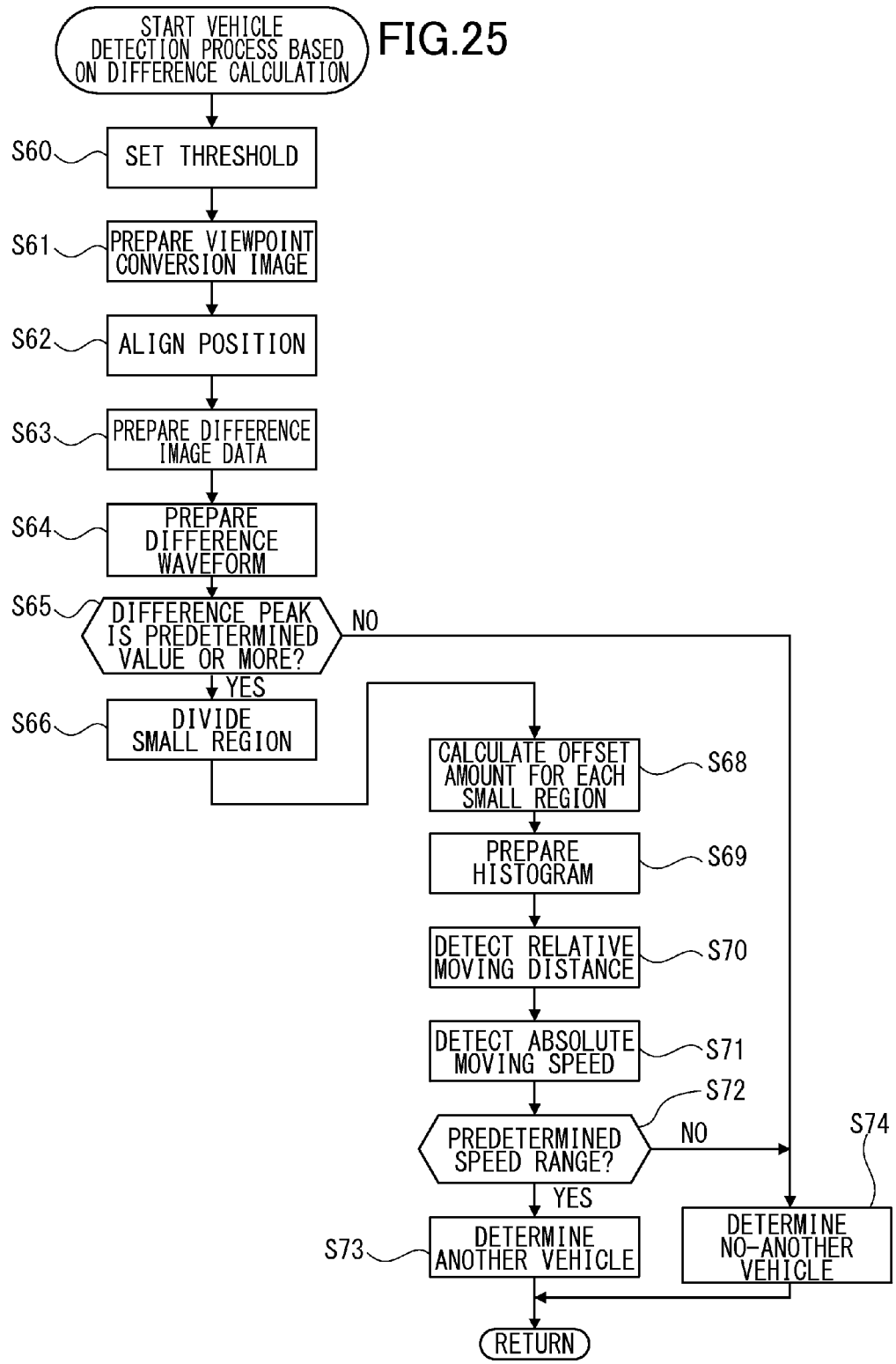
FIG. 25 is a flowchart illustrating a flow of a vehicle detection process based on difference calculation, which is executed in Embodiment 1 of the present invention.
Figure 31:
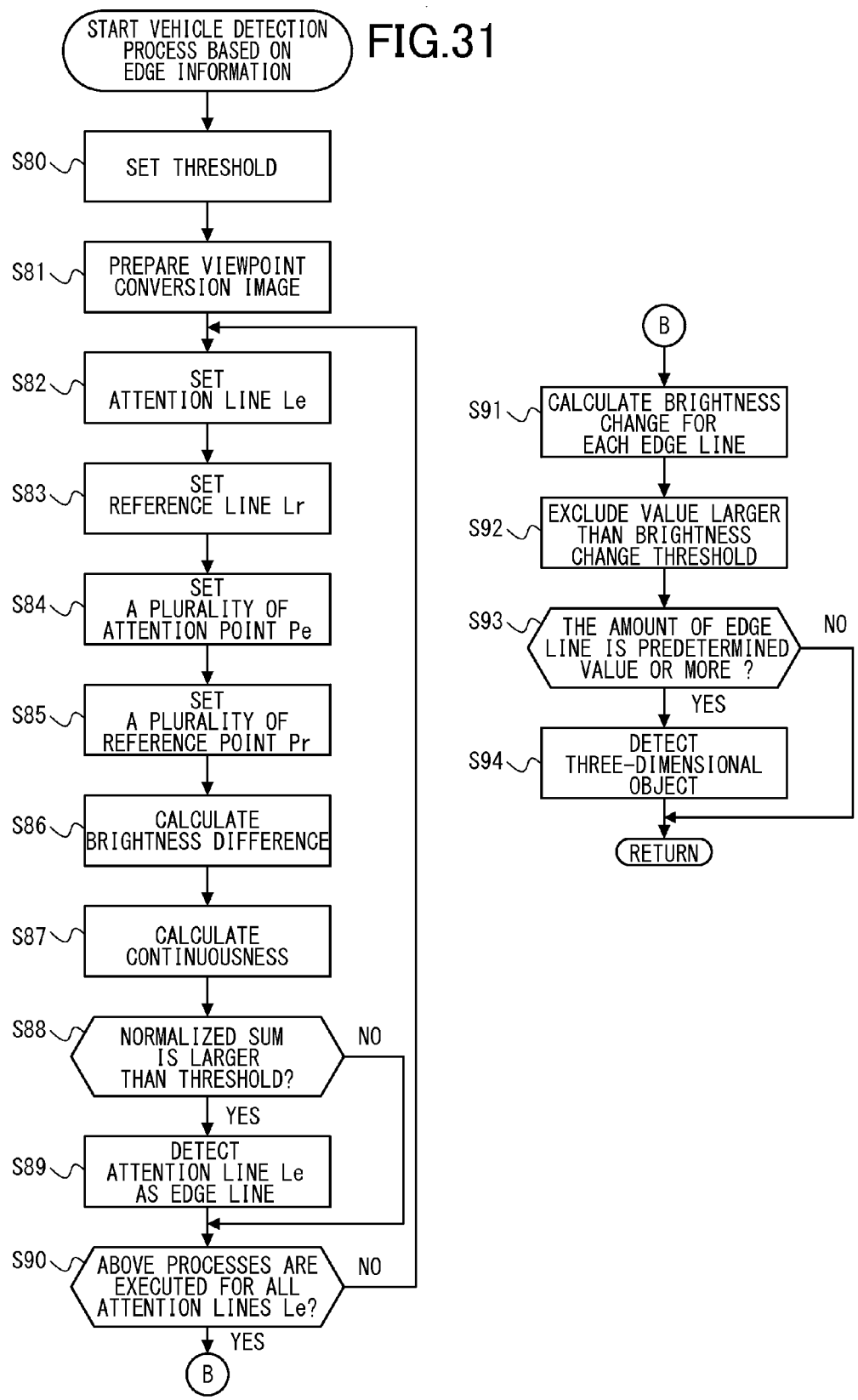
FIG. 31 is a flowchart illustrating a flow of a vehicle detection process based on edge information, which is executed in Embodiment 1 of the present invention.

Next, in Step S9, a close vehicle is detected from the image obtained by the imaging unit 10 in the close vehicle detector 72. The procedure of this process is illustrated in FIGS. 25, 31, and the details of the process will be described later.

Next, in Step S10, the necessity of the warning is determined based on the existence or non-existence of the other vehicle 6 detected in the close vehicle detector 72 and a relative speed of the other vehicle 6 to the vehicle 5. When it is necessary to output the warning, the process moves to Step S11, and when it is not necessary to output the warning, the process returns to Step S4.

Then, in Step S11, in the alert output unit 74, the warning is output with an indicator or a buzzer, and the existence of the close vehicle is informed to a driver of the vehicle 5 to alert the driver.

Figure 7:
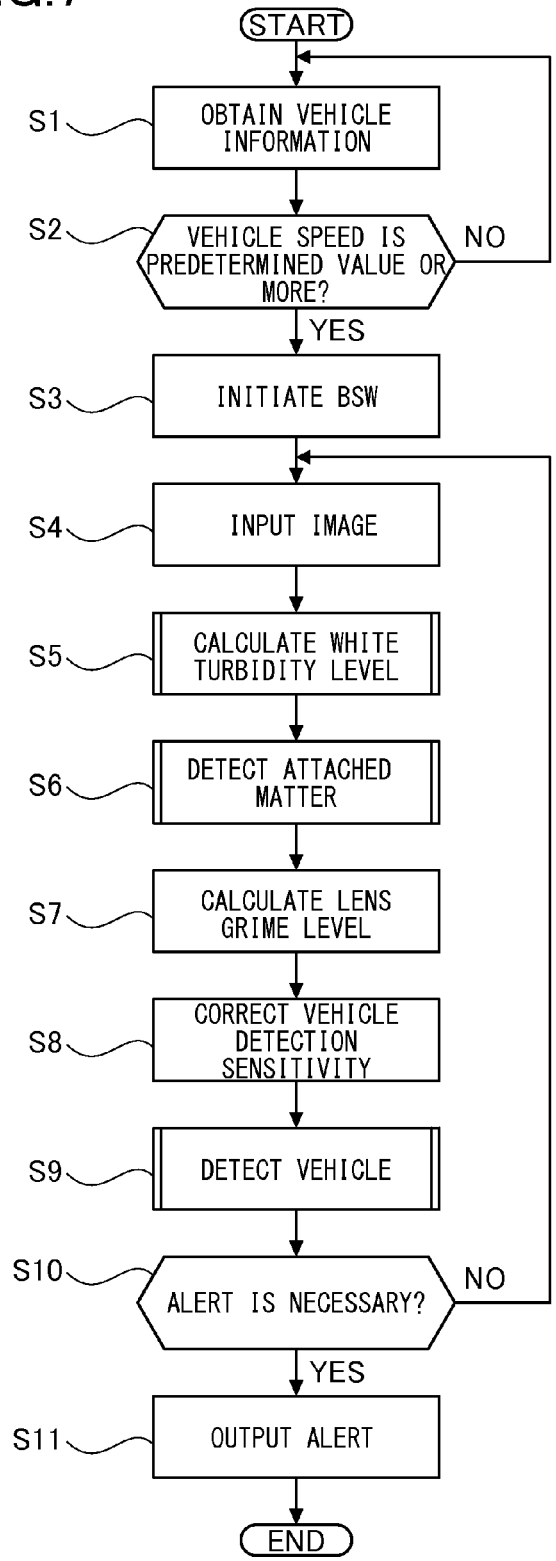
FIG. 7 is a flowchart of a main routine which is executed in Embodiment 1 of the present invention.

Next, the respective processes which are executed in the flowchart of FIG. 7 will be sequentially described in detail.

(White Turbidity Level Calculation Process Based on Brightness Gradient)

At first, the details of the white turbidity level calculation process which is executed in Step S5 in FIG. 7 will be described with reference to FIGS. 8 to 15. In the white turbidity level calculator 25, the white turbidity level of the lens 12 is calculated with a method based on the brightness gradient in the image obtained by the imaging unit 10 and a method based on the distribution of the edge intensity in the image obtained by the imaging unit 10. In this case, U1 denotes the white turbidity level of the lens 12 calculated based on the brightness gradient, and U2 denotes the white turbidity level of the lens 12 calculated based on the distribution of the edge intensity.

The first white turbidity level calculator 22 detects the image of the headlight of the following vehicle or the image by the reflection of the sunlight from the image I (x, y) by the imaging unit 10, sets a predetermined line in the detected image, and calculates the white turbidity level U1 of the lens based on the brightness gradient on the predetermined line.

This is because an image of a strong light source such as a headlight or sun scatters by white turbidity of a lens, and the scattering level is changed according to the white turbidity level of the lens, so that the image of the strong light source is observed as an image having a wider bright region when the white turbidity level is high.

FIGS. 8(A), 8(B) illustrate the image I (x, y) actually observed by the imaging unit 10 of the in-vehicle image recognizer 8, including the headlight of the following vehicle traveling in the same lane as the vehicle 5. FIG. 8(A) illustrates an image in a case where the surface of the lens 12 does not have white turbidity. FIG. 8(B) illustrates an image in a case where the surface of the lens 12 has white turbidity.

Graphs illustrated below the images I (x, y) in FIGS. 8(A), 8(B) each illustrate a distribution of a brightness value (hereinafter, referred to as brightness distribution Ld) in a scanning direction (line) OP extending leftward from a scanning start point O in the image of the headlight as a start point and a brightness distribution Ld in a line OQ extending rightward from the scanning start point O in the image of the headlight as a start point, shown within one graph.

In FIG. 8(A), it is set that a left-right or horizontal direction pixel number from a point where the brightness distribution Ld on the line OP goes down under a threshold A to a point where the brightness distribution Ld goes down under a threshold value B which is lower than the threshold A is referred to as $L_W$, and a left-right or horizontal direction pixel number from a point where the brightness distribution Ld on the line OQ goes down under the threshold A to a point where the brightness distribution Ld goes down under the threshold B which is lower than the threshold A is referred to as $R_W$. Then, the brightness gradient g is calculated by using brightness difference $D_I$ (=A−B) as $D_I/L_W$ (brightness gradient on line OP) and $-D_I/R_W$ (brightness gradient on line OQ). In the case of FIG. 8(A) where the lens does not have white turbidity, an absolute value of the brightness gradient g is a large value and the brightness distribution Ld has small dispersion and is sharpened.

On the other hand, in the case of FIG. 8(B) where the lens has white turbidity, an absolute value of the brightness gradient g is a small value and the brightness distribution Ld is broadened.

The first white turbidity level calculator 22 calculates the white turbidity level U1 of the lens 12 with the use of magnitude of the brightness gradient g. More specifically, as the absolute value of the brightness gradient g becomes smaller, the white turbidity level is calculated as a higher level. In addition, as described in detail later, in order to improve the certainty factor of the white turbidity level calculation, it is determined that the white turbidity occurs when a small brightness gradient g is maintained for a certain period.

Hereinafter, a method of calculating the white turbidity level U1 which is executed in the first white turbidity level calculator 22 will be described in detail with reference to FIG. 9.

In Step S20, the image I (x, y) (hereinafter, referred to as image I) obtained by the imaging unit 10 is minified by a predetermined ratio, and the minified image I' (x, y) (hereinafter, referred to as minified image I') is generated. The image is minified as described above to reduce a required memory upon an image process and to improve a process speed. A specific scale is determined in view of used computer specifications, an image resolution performance, and the like.

The diminution of the image is performed by thinning pixels and can be performed by averaging brightness values of adjacent pixels. Owing to the process, the image illustrated in FIG. 10(A) is minified to the image illustrated in FIG. 10(B).

Next, in Step S21, a region for detecting the image of the headlight of the following vehicle or the reflection image of the sunlight is set in the minified image I' obtained in Step S20. In this embodiment, a region having the image of the headlight of the following vehicle traveling in the same lane $Y_2$ as the vehicle 5 is set, and the image of the headlight of the following vehicle or the reflection image of the sunlight is detected from the region. Due to the limitation of the process region as described above, the load of the computer can be reduced.

Figure 11:
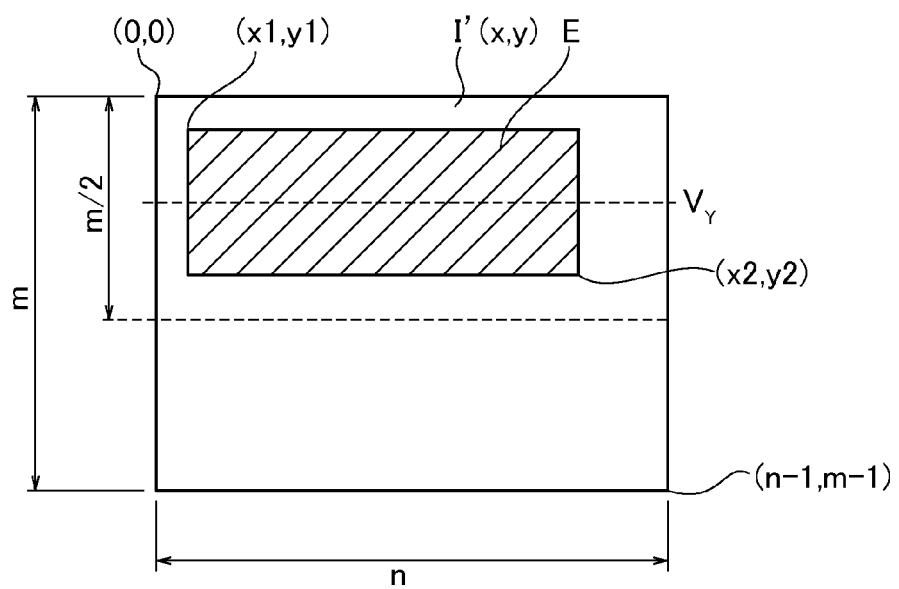
FIG. 11 is a view describing a range to execute a light source region detection process for calculating a white turbidity level based on a brightness gradient in Embodiment 1 of the present invention.

An example of the process region set as described above is illustrated in FIG. 11. As illustrated in FIG. 11, a process area E is set with an upper left position set as (x1, y1) and a lower right position set as (x2, y2) with respect to an image having n pixels in a horizontal direction and m pixels in a vertical direction.

A vertical position of the process area E is set based on a position of a vertical coordinate $V_Y$ (refer to FIG. 11) of a disappearing point defined by a heightwise installed position and a vertical installed angle of the imaging unit 10 to the vehicle 5. The disappearing point corresponds to a point at infinity.

A horizontal position of the process area E is set according to the horizontal installed position of the imaging unit 10 to the vehicle 5. That is, when the imaging unit 10 is disposed at a center of the vehicle 5, the processing area E is set in the minified image I' in a symmetrical manner in the horizontal direction. FIG. 11 is an example when the installed position of the imaging unit 10 to the vehicle 5 is offset in the horizontal direction, and the process area E is set in an asymmetrical manner in the horizontal direction.

Next, in Step S22, the minified image I' is binarized with a predetermined threshold in the processing area E set in Step S21 to be converted into a binarized image, and a labeling process to number each region constituting the binarized image is executed to the binarized image. In this case, as the predetermined threshold, a value with which the image of the headlight of the following vehicle traveling in the same lane $Y_2$ as the vehicle 5 can be detected and a value with which the reflection image of the sunlight can be detected are used. These values are previously set by experiments or the like. In addition, this threshold is stored in the region detector 22a.

When the image I is obtained, the value of the gain of the image I is read from the gain adjustor 16. When the read value of the gain is a predetermined value or more, it is determined that the image I is obtained at the nighttime and the image I is binarized by applying the threshold for detecting the image of the headlight of the following vehicle.

On the other hand, when the value of the gain of the image I is less than a predetermined value, it is determined that the image I is obtained in the daytime, and the image I is binarized by applying the threshold for detecting the reflection image of the sunlight.

The image illustrated in FIG. 10(C) is obtained by the binarization and the labeling process.

Next, in Step S23, it is determined whether or not there exists the image of the headlight or the reflection image of the sunlight in the image to which the labeling process is executed in Step S22. The process executed in Step S23 will be described with reference to FIGS. 12(A), 12(B).

The image of the headlight of the following vehicle traveling in the same lane $Y_2$ as the vehicle 5, which is obtained by the imaging unit 10, has an approximate circular shape shown as a region $R_0$ in FIG. 12(A). Accordingly, with respect to each region where the labeling process is executed, when an area $H_0W_0$ of a rectangular region (vertical pixel number $H_0$, horizontal pixel number $W_0$) is circumscribed to the region, it is determined that an area of the region occupies a predetermined ratio or more within the area $H_0W_0$ and that a width and a height of the square circumscribed to the region are not different from each other at a predetermined ratio or more. It can be thus determined whether or not there exists the image of the headlight.

The reflection image of the sunlight which is obtained by the imaging unit 10 has an approximate circular shape similar to the region $R_0$. The threshold of the occupancy showing the shape of the image and the threshold of the horizontal to vertical ratio of the circumscribed square are therefore quantified similar to the image of the headlight, so that it is determined whether or not the actually detected region satisfies the conditions.

According to the determination, for example, a region having a shape such as a region $R_1$, $R_2$, or $R_3$ illustrated in FIG. 12(B) is determined as not being the image of the headlight or the reflection image of the sunlight and dismissed.

According to the determination, one region satisfying the conditions is selected as illustrated in FIG. 10(D). When a plurality of regions satisfying the conditions is found, one region having the largest area is selected. When no region satisfying the conditions is found (No in Step S23), the process returns to the main routine (FIG. 7).

Next, in Step S24, a centroid position G of the region selected in Step S23 is calculated. When a coordinate of the centroid position G of the region is set as G (Gx, Gy), a horizontal position Gx of the centroid position G is calculated by dividing a sum of horizontal coordinates of all pixels forming the region by the area of the region, and a vertical position Gy of the centroid position G is calculated by dividing a sum of vertical coordinates of all pixels forming the region by the area of the region.

Next, in Step S25, a scanning start point O for calculating a brightness gradient g and a scanning direction (line) for calculating a brightness gradient are set in the minified image I'. The scanning start point O and the line are set according to determination of a position and a direction which are insusceptible to the splash by the vehicle 5, the road surface reflection of the headlight of the following vehicle, the headlight of the vehicle traveling on a close lane, or the like based on experiments or the like.

Figure 13:
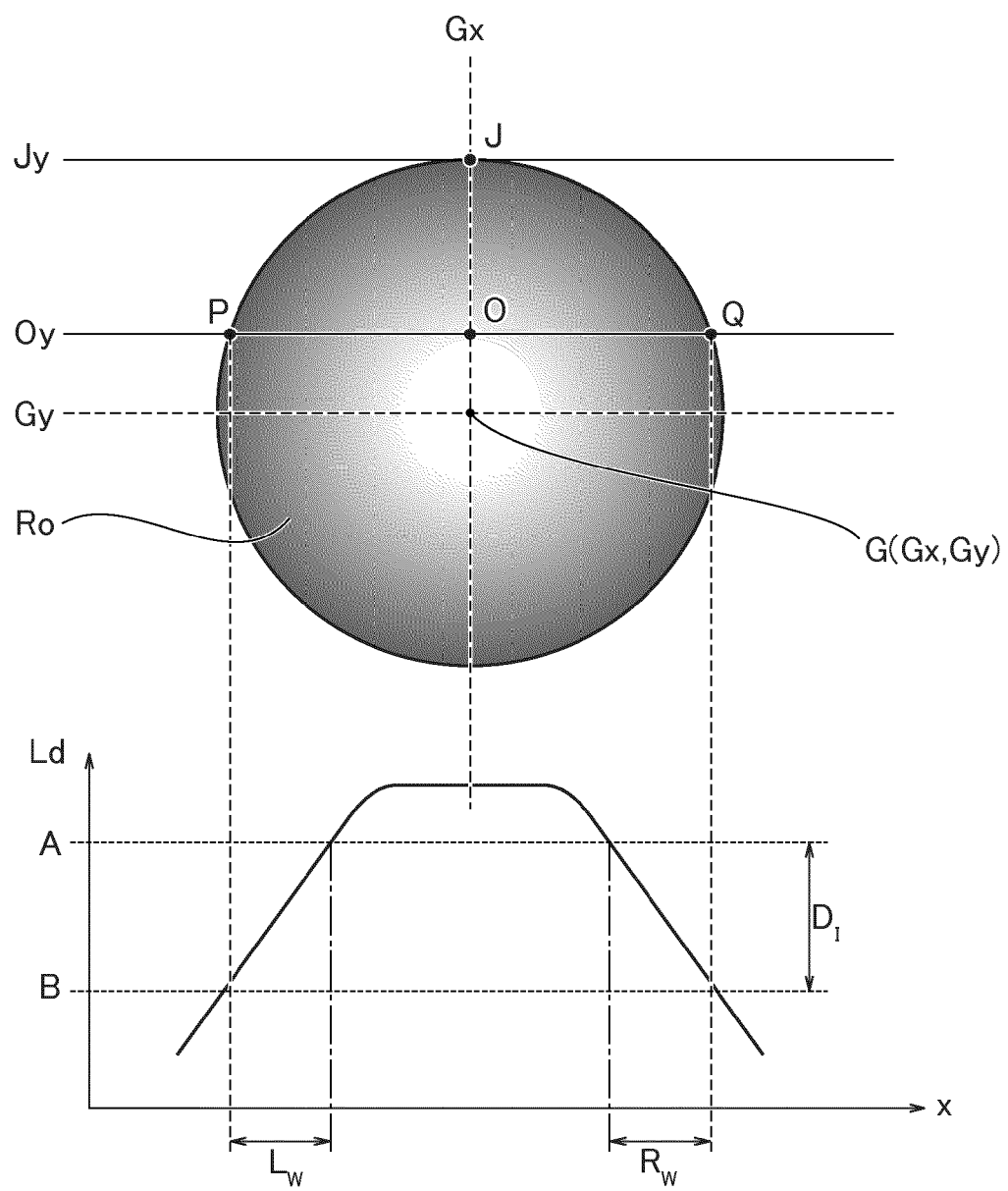
FIG. 13 is a view illustrating an example of a predetermined line to calculate a brightness gradient for calculating a white turbidity level, and an example of the brightness gradient.

In this embodiment, as illustrated in FIG. 13, the scanning start point O for calculating the brightness gradient g is set between the centroid position G of the region $R_0$ and the upmost point J of the region $R_0$. FIG. 13 is a view describing an example of setting the lines OP, OQ for calculating the brightness gradient, and an example of the brightness gradient which is calculated on the lines OP, OQ.

More specifically, a vertical coordinate Oy of the scanning start point O is obtained by Equation 1:

Equation 1:

$$Oy=Jy+(Gy-Jy)/Th_y \quad (1)$$

where Jy is a vertical coordinate of the upmost point J of the region $R_0$. The threshold $Th_y$ is set to a value larger than 0. The value of the threshold $Th_y$ is set based on experiments or the like.

As illustrated in FIG. 13, lines parallel to a horizontal line passing the scanning start point O and the centroid position G of the region $R_0$ are set as the lines OP, OQ.

Next, in Step S26, the brightness values stored in the minified image I' are read on the line OP from the scanning start point O to the point P to calculate the brightness distribution Ld. The brightness values stored in the reduced image I' are read on the line OQ to calculate the brightness distribution Ld.

The brightness distributions Ld calculated as described above are illustrated in the graph of FIG. 13. The graph illustrates the brightness distribution on the line OP and the brightness distribution on the line OQ in a single graph for the sake of description.

Next, in Step S27, the size of a skirt of the brightness distribution Ld in a horizontal direction is obtained. Here, the threshold A of the brightness value and the threshold B of the brightness value smaller than the threshold A are previously prepared. In the previously prepared brightness distribution Ld, the brightness values are scanned from the scanning start point O to the point P in a leftward direction to calculate an interval between a position where the brightness value goes down under the threshold A and a position where the brightness value goes down under the threshold B as the horizontal pixel number Lw, as illustrated in FIG. 13. Then, the brightness values are scanned from the scanning start point O to the point Q in a rightward direction to calculate an interval between a position where the brightness value goes down under the threshold A and a position where the brightness value goes down under the threshold B as the horizontal pixel number $R_W$.

Next, in Step S28, the brightness gradient g is calculated. More specifically, the brightness difference $D_I(=A-B)$ which is a difference value between the threshold A and the threshold B is used to calculate the brightness gradient g on the line OP as $D_I/L_W$ and to calculate the brightness gradient g on the line OQ as $-D_I/R_W$.

Next, in Step S29, it is determined whether or not $D_I/L_W$ and $-D_I/R_W$ which are the right and left brightness gradients g of the region $R_0$ have symmetry. The symmetry determination is executed by confirming whether or not a gap $G_I$ of the brightness gradient g calculated by Equation 2 is a predetermined threshold $Th_G$ or below.

$$G_I=(|L_W|-|R_W|)/(|L_W|+|R_W|) \quad \text{Equation 2:}$$

In the case where a plurality of regions continuously appears in a horizontal direction, a magnitude of the left brightness gradient g is different from a magnitude of the right brightness gradient g and therefore the gap $G_I$ calculated by Equation 2 becomes larger than the threshold $Th_G$. In this case, the calculation of the white turbidity level is not executed and the process moves to Step S35.

Next, in Step S30, the white turbidity level U1 of the lens 12 is calculated. The white turbidity level U1 is calculated as an average value of the absolute values of $D_I/L_W$ and $-D_I/R_W$ which are the previously calculated left and right brightness gradients g, as illustrated in Equation 3.

$$U1=\{(L_W/D_I)+(R_W/D_I)\}/2 \quad \text{Equation 3:}$$

In Equation 3, the inverses of the brightness gradients g are averaged. Such calculation is for obtaining a larger value of U1 as the white turbidity level of the lens 12 becomes a higher level (grime level is higher level).

Next, in Step S31, it is determined whether or not the previously detected region $R_0$ is identical to a region $R_0$ detected at one step before. Namely, it is determined whether or not the images are obtained from the same light source.

This determination is performed by comparing an average value Ave (U1) of the white turbidity levels U1 calculated in the previous process with the latest white turbidity level calculated by Equation 3. When a difference between the average value Ave (U1) of the previous white turbidity levels and the latest white turbidity level U1 is small, it is determined that the images are obtained from the same light source at the region.

This process is executed in the similarity calculator 22c. More specifically, when Equation 4 is satisfied, it is determined that the images are generated from the same light source:

$$Th_{LOW}<U1/Ave(U1)<Th_{HIGH} \quad \text{Equation 4:}$$

where, $Th_{LOW}$ is the minimum threshold to determine that the images are from the same light source and $Th_{HIGH}$ is the maximum threshold to determine that the images are from the same light source.

In Step S31, when it is determined that the images are from the same light source, then, a total count T showing that the images which are considered from the same light source are continuously detected is incremented in Step S32, and the process moves to Step S34. In addition, the processes after Step S32 are executed in the certainty factor determination unit 22d, and the value of the total count T which is incremented in Step S32 is stored as needed in the certainty factor determination unit 22d.

On the other hand, in Step S31, when it is determined that the images are not from the same light source, the total count T is decremented in Step S33, and the process moves to Step S35. In addition, the value of the total count T decremented in Step S33 is stored as needed in the certainty factor determination unit 22d.

Next, in Step S34, the white turbidity level U1 previously calculated in Step S30 is stored, in the certainty factor determination unit 22d. The average value Ave (U1) of the white turbidity levels is recalculated and updated based on the average value Ave (U1) of the white turbidity levels calculated in the past process and the previously calculated white turbidity level U1. The updated average value Ave (U1) of the white turbidity levels is stored in the certainty factor determination unit 22d.

In Step S35, the certainty factor F of the calculated white turbidity level is determined and updated. The certainty factor F is expressed by a value of the total count T. It is determined that the larger the value T is, namely, it is considered as the white turbidity level U1 which is continuously detected based on the brightness gradient of the image by the same light source, the higher the certainty factor F is. Then, the value of the certainty factor F is updated.

Figure 14:
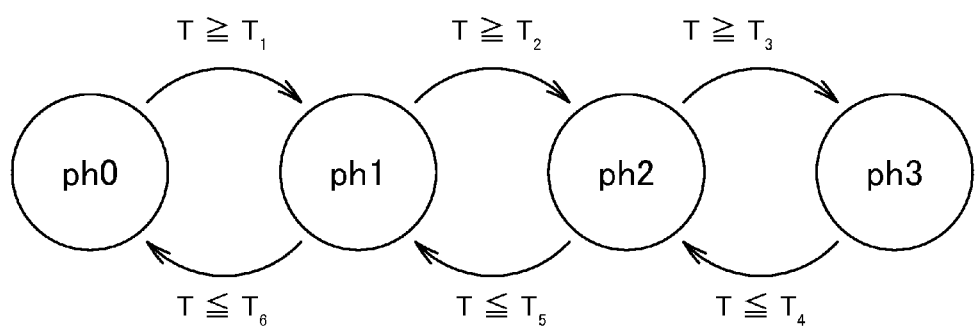
FIG. 14 is a view describing a state shift illustrating a shift of a certainty factor of the white turbidity level in Embodiment 1 of the present invention.

In addition, in the present embodiment, as illustrated in FIG. 14, the certainty factor F is managed by dividing into four levels such as Ph0, Ph1, Ph2, and Ph3. Ph3 shows the highest certainty factor F, namely, it shows that the calculated white turbidity level U1 is most reliable. The level of the certainty factor F is shifted according to the value T.

Namely, in FIG. 14, in the initial state, the level of the certainty factor F is Ph0. When the value of the total count T showing that the images considered from the same light source are continuously detected exceeds a predetermined value T1, the level of the certainty factor F is shifted to Ph1. Then, when the value of the total count T exceeds a predetermined value T2, the level of the certainty factor F is shifted to Ph2. When the value of the total count T exceeds a predetermined value T3, the level of the certainty factor F is shifted to Ph3.

On the other hand, when the level of the certainty factor F is Ph3, and the value of the total count T is decremented and goes down under the predetermined value T4, the level of the certainty factor F is shifted to Ph2. Then, when the value of the total count T goes down under the predetermined value T5, the level of the certainty factor F is shifted to Ph1. When the value of the total count T goes down under the predetermined value T6, the level of the certainty factor F is shifted to Ph0.

When the certainty factor F is shifted to another level, in order to prevent hunting where the certainty factor F returns back to the original level, if the certainty factor F is shifted to a higher level, a predetermined value $Tc_1$ may be added to the total count T, and if the certainty factor F is shifted to a lower level, a predetermined value $Tc_2$ may be subtracted from the total count T. When the update of the certainty factor F is executed, the process of FIG. 9 is completed, and the process returns to the main routine (FIG. 7).

(White Turbidity Level Calculation Process Based on Edge Intensity)

The second white turbidity level calculator 24 calculates a white turbidity level U2 of a lens based on a distribution of edge intensity from the image I obtained by the imaging unit 10.

When the white turbidity occurs on the surface of the lens 12, the blurred image I is obtained. The blur level becomes higher as the white turbidity level becomes higher. In this embodiment, the blur level is calculated based on the distribution of the edge intensity in the image I.

Hereinafter, the calculation procedure of the white turbidity level U2 will be described with reference to FIG. 15.

Figure 15:
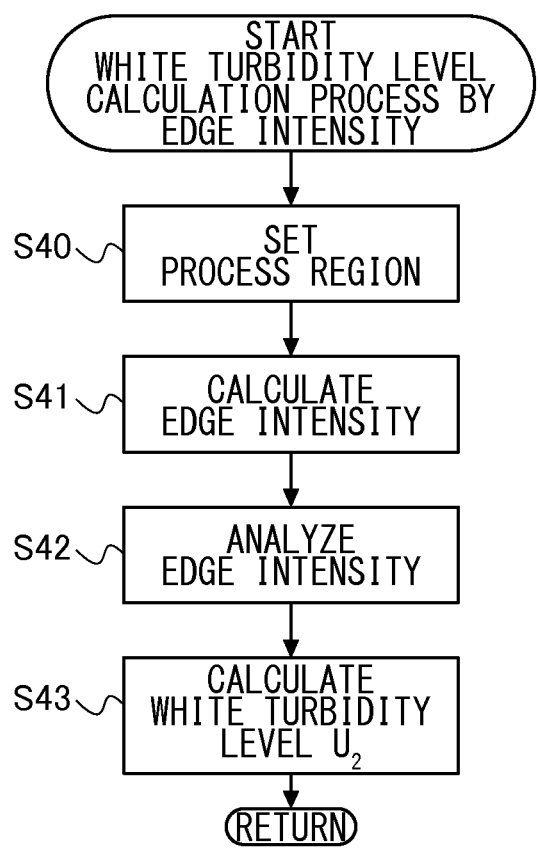
FIG. 15 is a flowchart illustrating a flow of a white turbidity level calculation process based on an edge strength, which is executed in Embodiment 1 of the present invention.
Figure 16:
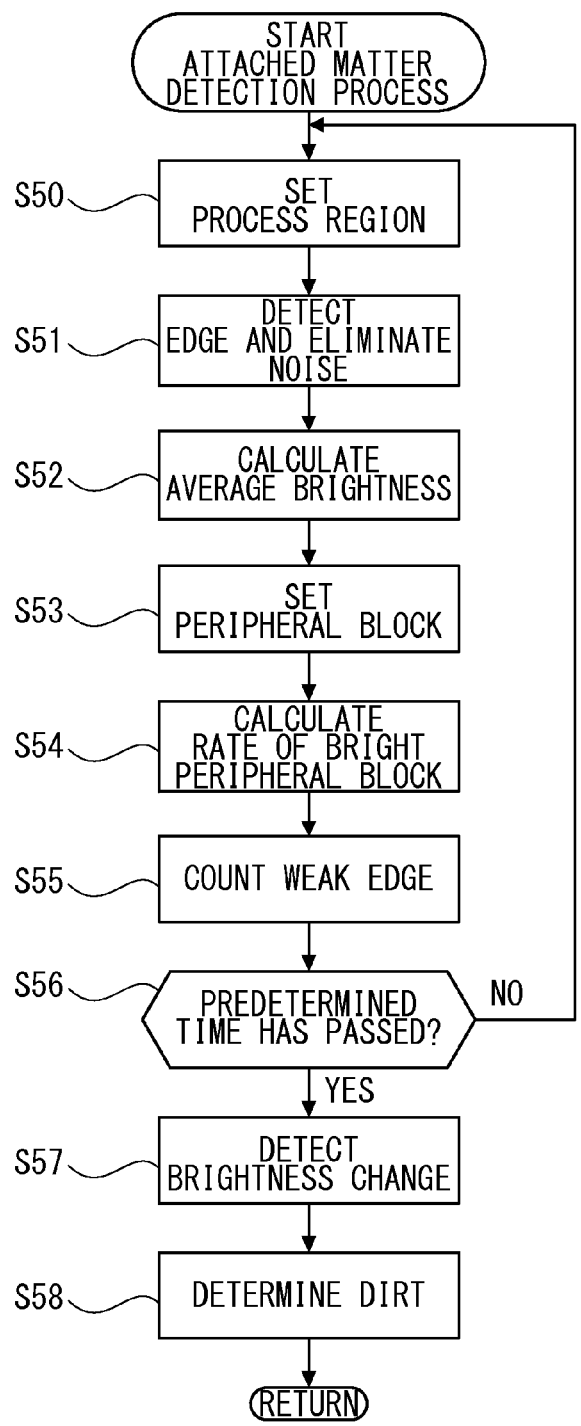
FIG. 16 is a flowchart illustrating a flow of an attached matter detection process which is executed in Embodiment 1 of the present invention.

At first, referring to FIG. 15, in Step S40, a region to execute edge detection is set in the image I obtained by the imaging unit 10 in the edge intensity calculator 24a. The region to execute edge detection may be set to the entire image I or limited to a position where an edge is likely to appear.

In the daytime, a region including a horizon line in the backward of the vehicle 5 may be set, the edge detection may be executed for the inside of the region, and the edge intensity may be calculated based on the edge formed by the horizon line. In the nighttime, a region including the lanes $Y_1$, $Y_3$ close to the lane $Y_2$ in which the vehicle 5 travels may be set, the edge detection may be executed for the inside of the region, and the edge intensity may be calculated based on the edge of the other vehicle 6 on a close lane. In this case, the daytime and the nighttime can be distinguished based on the value of the gain adjusted in the gain adjustor 16 as described above.

Next, in Step S41, in the edge intensity calculator 24a, the edge intensity is obtained with respect to each pixel in the image I with the use of an edge detection operator in the region set in Step S40. A coefficient of an edge detection filter for use in this process is not specifically limited.

Next, in Step S42, in an edge intensity analyzer 24b, the values of the edge intensity calculated with respect to each pixel of the image I are averaged to calculate an average edge intensity. In addition, the average edge intensity is previously normalized by an area of the region for the edge detection. Consequently, it is determined that the smaller the calculated average edge intensity is, the lower the clarity of the image I is, namely, the higher the white turbidity level is. Moreover, it is determined that the higher the average edge intensity is, the higher the clarity of the image I is, namely, the lower the white turbidity level is.

In addition, the average edge intensity may be calculated not only from one image, but also from a plurality of images obtained in different times. When the average edge intensity is calculated from a plurality of images, the average edge intensity is calculated by averaging the average edge intensity of the plurality of images. The clarity of the image I can be thereby stably evaluated even when noise is suddenly mixed in the image I. In this case, a change in average edge intensity is obtained for a predetermined time. When a change in average edge intensity is small, it is determined that the calculated average edge intensity, namely, the reliability of the white turbidity level is high, and the above-described certainty factor F can be calculated.

In Step S43, the white turbidity level U2 is calculated based on the average edge intensity. More specifically, for example, the inverse of the normalized average edge intensity is calculated as the white turbidity level U2.

(Attached Matter Detection Process)

Next, the details of the attached matter detection process in Step S6 of FIG. 7 will be described with reference to FIGS. 16 to 19. In the attachment level calculator 26, the attachment level of the attached matter such as dirt or water drops attached to the lens 12 is calculated based on the distribution of the brightness value and the edge intensity in the image I. In this case, M denotes the attachment level of the attached matter calculated in the attachment level calculator 26.

Hereinafter, a method of calculating the attachment level M of the attached matter which is executed in the attachment level calculator 26 will be described in detail with reference to an example to detect dirt as attached matter.

In Step S50, in the process region-setting unit 26a, the image I obtained by the imaging unit 10 is minified with a predetermined ratio to obtain the minified image I'. The image is minified as described above to reduce a required memory upon an image process and to improve a process speed. A specific scale is determined in view of used computer specifications, an image resolution performance, and the like. Then, an area to execute attached matter detection is set in the minified image I'.

The minified image I' generated herein has the same reference number as the minified image I' generated for calculating the white turbidity level. However, the scale is not necessary to be the same scale for both of the minified images. The images are minified with a scale in accordance with the respective images.

The entire minified image I' may be set to the region to execute attached matter detection. However, in the present embodiment, a region encompassing a vehicle detection region of the BSW system 9 which is an image recognition application to be used is set to a process target region. By setting the process target region as described above, the accuracy of the image recognition application can be improved, and the process efficiency of the attached matter detection process can be also improved.

Figure 17:
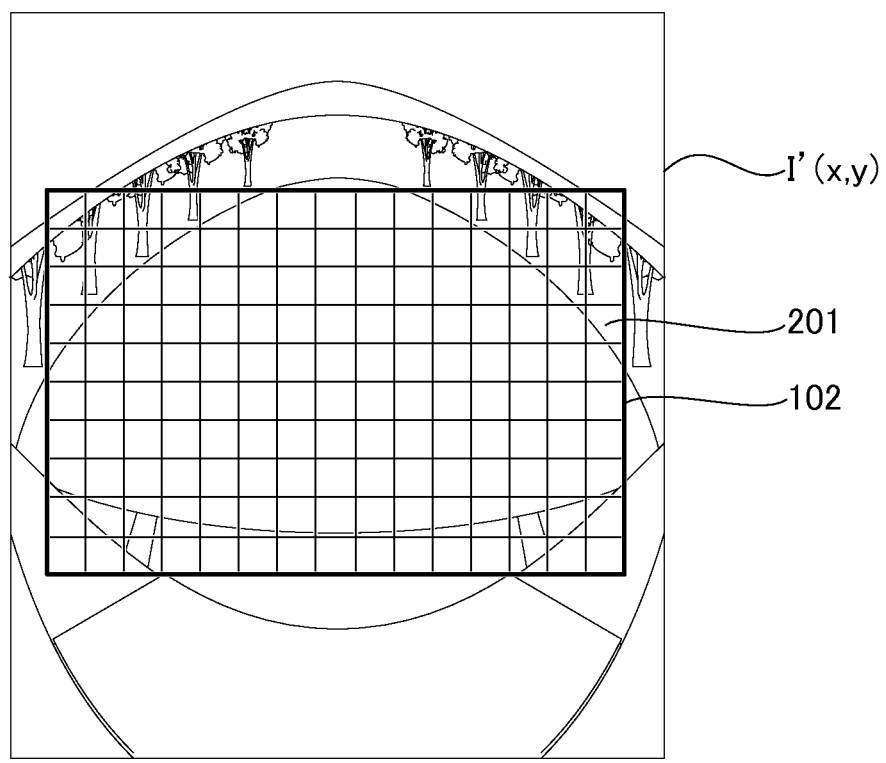
FIG. 17 is a view illustrating an example in which blocks are set in an obtained image in Embodiment 1 of the present invention.
Figure 18:
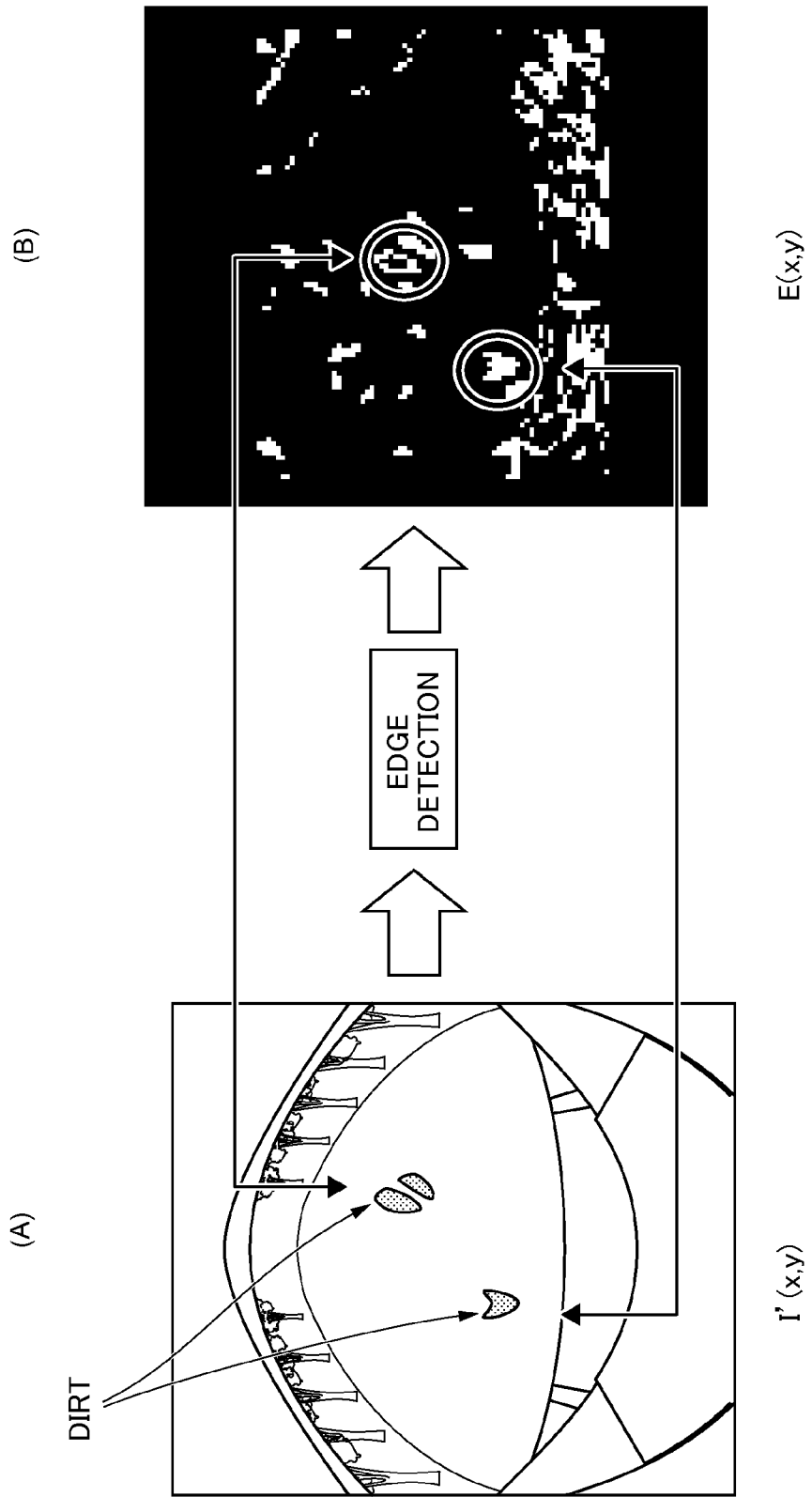
FIG. 18(A) is a view illustrating an example of an obtained image and FIG. 18(B) is a view illustrating an example of an edge configuration point detected from the image.

In Step S50, the set process target region is divided into a plurality of blocks 201, as illustrated in FIG. 17. The subsequent processes are executed with respect to each block. In this embodiment, the size of each block 201 is set to a size of attached matter to be detected or below. By setting the size of each block as described above, only dirt can be reliably and effectively detected. The information such as a coordinate of each block 201 divided as described above is stored in the process region-setting unit 26*a* in accordance with a block number applied to each block.

Next, in Step S51, in the edge detector 26*b*, an edge detection process and noise elimination relative to the edge detection result are executed. The edge detection process is executed to the minified image I' generated in Step S50. This edge detection is executed by a known method. A threshold process is executed to the edge intensity obtained by the edge detection, and a necessary edge configuration point is only extracted. That is, the edge intensity ρ generates an edge image E (x, y) including only the edge configuration point (weak edge configuration point) having a value within a predetermined range.

FIG. 18(B), illustrates one example of the edge image E (x, y) generated as described above. FIG. 18(B) illustrates the edge image E (x, y) obtained from the minified image I' illustrated in FIG. 18(A). In FIG. 18(B), dirt portions are detected as weak edges.

Dirt while a vehicle is traveling on a deteriorated condition road such as an off-road and dirt while a vehicle is traveling on an on-road differ in concentration and color, and may differ in weak edge intensity level although they are the same dirt. The edge intensity may differ according to the type of the attached matter. For this reason, a plurality of thresholds is prepared relative to the edge intensity ρ according to road conditions, traveling conditions, types of attached matters, attachment conditions, or the like. It may be determined which threshold is used upon the execution of the attached matter detection process.

In Step S51, a noise elimination process of eliminating noise in the generated edge image E (x, y) is executed. In the present embodiment, the edge configuration point satisfying the following conditions is defined as noise.

(a) An edge configuration point in which the edge configuration point in the image E (x, y) detected in the previous process is not detected in the same position in the present edge detection process.

(b) An edge configuration point having an area of a predetermined value or below.

At first, AND of the edge image E (x, y, t) generated at time t and the edge image E (x, y, t−Δt) generated at time t−Δt by the last edge detection process is obtained, and the edge configuration point satisfying the above condition (a) is eliminated as noise. This is because the edge configuration point which is detected in the attached matter detection process is an edge of attached matter adhered to the lens 12, and the attached matter adhered to the lens 12 exists in the same position for a certain period.

Next, the edge configuration point satisfying the above condition (b) is eliminated as noise. This is because the edge of the grime adhered to the lens 12 has a certain size, so that it is considered that an independent small edge is not grime. By eliminating noise as described above, the lens-attached matter can be detected with high accuracy.

Next, in Step S52, in the brightness distribution calculator 26*c*, the brightness distribution calculation process is executed. In this case, the average brightness value $I_{ave}$ (u, v) of the pixels in each block 201 is calculated with respect to each block 201 set in Step S50. Here, u, v denote a horizontal position and a vertical position of each block. In addition, the average brightness value $I_{ave}$ (u, v) is calculated by obtaining a sum of the brightness values of the pixels in the block 201, and dividing the obtained sum of the brightness values with the area (the number of pixels) of the block 201.

Figure 19:
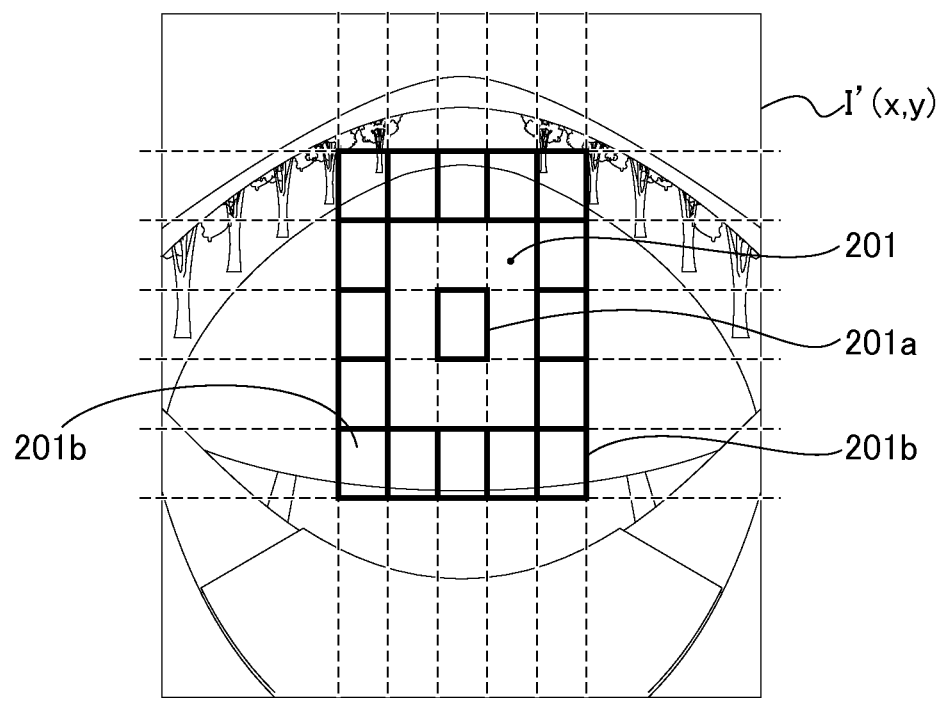
FIG. 19 is a view describing a process of counting a bright peripheral block in Embodiment 1 of the present invention.

Next, in Step S53, an attention block and a block around the attention block (hereinafter, peripheral block) are set based on the average brightness value $I_{ave}$ (u, v) of each block. The block illustrated by the thick line in FIG. 19 is the attention block 201*a*. The attention block 201*a* is selected from blocks having a low average brightness value. That is, the brightness value of the region where dirt is attached is likely to be lower than the average brightness value of the region where dirt is not attached.

Moreover, blocks located in the outer circumference of the blocks 201 adjacent to the attention block 201*a* and located in the outer circumference of the attention block 201*a* are selected as the peripheral blocks 201*b*. Namely, dirt is usually adhered not only to one block but also to the adjacent blocks. It is therefore considered the difference in average brightness value $I_{ave}$ (u, v) between the attention block 201*a* and the adjacent blocks is small. For this reason, the blocks outside the blocks adjacent to the attention block 201*a* are selected as the peripheral blocks 201*b*.

In addition, the method of setting the peripheral block 201*b* is not limited to the above. When an attachment area of attached matter is small, the block 201 adjacent to the attention block 201*a* may be set as the peripheral block 201*b*. Moreover, when an attachment area of attached matter is large, a block a few blocks away from the attention block 201*a* may be set as the peripheral block 201*b*.

Next, in Step S54, the number of peripheral blocks 201*b* (bright peripheral block) having an average brightness value $I_{ave}$ (u, v) higher than the average brightness value $I_{ave}$ (u, v) of the attention block 201*a* is counted. In this case, the counting is executed with the use of the brightness value before binarization. Next, the ratio of the bright peripheral block 201*b* (the number of bright peripheral blocks/total of peripheral blocks) is calculated. In this case, the ratio of the bright peripheral block becomes higher for the block (attention block) having dirt.

Next, in Step S55, the number of pixels constituting a weak edge is counted from the edge image E (x, y) detected in the edge detection process. The counting of the weak edge is executed with the use of the image after binarization. Dirt attached to the lens 12 is not focused, and has a blurred contour. Such dirt is likely to have a weak edge as a block.

Consequently, in the attached matter detection process of the present embodiment, the number of weak edge configuration points is counted with respect to each block, and the counting number is stored.

After completing the above process relative to one minified image I', the process time determination process is executed in Step S56. In Step S56, it is determined whether or not a predetermined time has passed. When a predetermined time has passed, the process moves to Step S57. When a predetermined time has not passed, the process returns to Step S50.

By repeating Steps S50 to S55 within a predetermined time as described above, information such as the average brightness value, the ratio of bright peripheral block, and the counting number of the weak edge is stored in chronological order. In addition, the predetermined time can be freely set according to types of attached matter, vehicle information such as a vehicle speed, or the like. For example, on a rainy day or during off-road traveling, dirt is frequently attached to a lens. For this reason, it is necessary to detect dirt in a short time, and rapid warning is required. It is therefore preferable to set a short predetermined time.

On the other hand, on a sunny day or during on-road traveling, dirt is hardly attached to a lens. In order to enable highly accurate detection, it is preferable to accumulate information for a long period of time. It is therefore preferable to set a long predetermined time.

Next, in Step S57, in the brightness change calculator 26d, the brightness change extraction process is executed. Since the dirt attached to the lens 12 hardly moves even after elapse of a certain period of time and the permeability of the dirt is low, a change in brightness value in a time direction within the region becomes small. In order to study such a change in brightness value in the time direction, the dispersion and the average value of the average brightness values $I_{ave}$ (u, v) in the time direction in the same blocks are calculated.

In Step S57, the average brightness values $I_{ave}$ (u, v) of the same blocks are averaged in the time direction, so that a time average brightness value $E_0$ is calculated with respect to each block.

Next, the dispersion V of the average brightness value $I_{ave}$ (u, v) in the time direction is calculated with respect to each block based on the calculated time average brightness value $E_0$ of each block.

Then, in Step S58, the dirt determination is performed in the attached matter determination unit 26e.

The dirt determination is executed by calculating a dirt score with respect to each block 201 based on the following information.

More specifically, in the block 201 having the counting number of the weak edge smaller than a threshold, it is considered that the attachment rate of dirt is low and the dirt score is low. When the ratio of the bright block number in the peripheral blocks 201b is higher than a threshold, it is considered that the dirt score of the block 201 is high. When the dispersion of the average brightness value of the block 201 having a high dirt score is a predetermined threshold or below, it is considered that the dirt is likely to be attached to the block 201.

According to the calculated dirt score, when the dirt score of the block 201 is a threshold or more and the dispersion V of the time average brightness value $E_0$ of the block 201 is a predetermined threshold or below, it is determined that the block 201 includes dirt. Then, an attachment level M according to the dirt score is calculated.

In addition, the dirt determination is described in the above example. However, the attached matter is not limited to dirt. The attachment level M can be similarly calculated even when water drops are attached to a lens. Then, after completing Step S58, the process goes back to the main routine (FIG. 7).

(Lens Grime Level Calculation Process)

Next, the details of the lens grime level calculation process which is executed in Step S7 of FIG. 7 will be described.

In this case, the grime level of the lens 12 is quantified based on the previously calculated first white turbidity level U1, second white turbidity level U2, and attachment level M.

More specifically, at first, a white turbidity level U of the lens 12 is calculated based on the value of the first white turbidity level U1 or the value of the second white turbidity level U2. In this case, the white turbidity level U may be calculated based only on the first white turbidity level U1, the white turbidity level U may be calculated based only on the second white turbidity level U2, or the white turbidity level U may be calculated based on both of the first and second white turbidity levels U1, U2.

The use of the first white turbidity level U1 or the second white turbidity level U2 is determined based on the environment under which these values are calculated and the certainty factor of the first white turbidity level U1 or the second white turbidity level U2.

Namely, when the magnitude of the gain is a predetermined value or more after monitoring the value of the gain adjusted in the gain adjustor 16, that it, in the nighttime, the headlight of the following vehicle of the vehicle 5 is clearly made as a picture. Therefore, the value of the white turbidity level U is calculated by using the value of the first white turbidity level U1 calculated from that image of the headlight.

However, even in the nighttime, when a following vehicle does not exist, the first white turbidity level U1 cannot be calculated based on the image of the headlight. In this case, the value of the white turbidity level U is calculated by using the value of the second white turbidity level U2 when the image of the headlight is not detected.

On the other hand, when the magnitude of the gain does not satisfy the predetermined value, that is, in the daytime, the reflection image of the sunlight is clearly made as a picture. Therefore, the value of the white turbidity level U is calculated by using the value of the first white turbidity level U1 calculated from the reflection image of the sunlight.

However, even in the daytime, when the reflection image of the sunlight does not exist, the first white turbidity level U1 cannot be calculated based on the reflection image of the sunlight. In this case, the value of the white turbidity level U is calculated by using the value of the second white turbidity level U2 when the reflection image of the sunlight is not detected.

Then, the calculated value of the white turbidity level U and the previously calculated value of the attachment level M are informed to the detection sensitivity adjustor 50.

(Correction Process of Vehicle Detection Threshold)

Next, in Step S8 of FIG. 7, the vehicle detection sensitivity when the other vehicle 6 is detected in the vehicle detector 70 is corrected. This process is executed in the detection sensitivity adjustor 50.

In the detection sensitivity adjustor 50, the various thresholds which are used for detecting a vehicle in the vehicle detector 70 are corrected according to the value of the white turbidity level U and the value of the attachment level M. The specific thresholds will be described later.

When the value of the white turbidity level U is large, that is, when the surface of the lens 12 has white turbidity, the clarity of the image I obtained by the imaging unit 10 is deteriorated. For this reason, in a case of executing the edge detection, for example, if the threshold of the edge detection is not corrected to a value smaller than a value when the surface of the lens 12 does not have white turbidity, a vehicle cannot be detected. The thresholds are therefore corrected.

However, in fact, the correction of the various thresholds based only on the value of the white turbidity level U is not sufficient for detecting a vehicle. Namely, when the surface of the lens 12 has white turbidity and the surface of the lens 12 also has dirt or water drops, it is determined that the white turbidity level is further advanced in the first white turbidity level calculator 22 even when the white turbidity level is unchanged, so that a white turbidity level U higher than an actual level is calculated.

When various thresholds are corrected based on the calculated higher white turbidity level U, the detection sensitivity of the vehicle becomes too high, and unnecessary noise is easily detected. Thus, it becomes difficult to detect a vehicle.

The detection sensitivity adjustor 50 therefore controls the correction amount of the various thresholds in view of not only the value of the white turbidity level U but also the value of the attachment level M when the value of the attachment level M is large even if the value of the white turbidity level U (high white turbidity level) is large. In addition, the specific method of correcting a threshold will be described later.

(Vehicle Detection Process)

Next, the details of the vehicle detection process in Step S9 of FIG. 7 will be described with reference to FIG. 25.

<<Detection of Three-Dimensional Object Based on Difference Waveform Information>>

At first, in Step S60, in the detection sensitivity adjustor 50, the various thresholds corrected based on the grime level (white turbidity level U and attachment level M) of the lens 12 are set to the close vehicle detector 72. The details of this process will be described later.

Next, in Step S61, in the viewpoint convertor 72a, the image I obtained by the imaging unit 10 is converted into a virtual top-down image. Hereinafter, this conversion is referred to as viewpoint conversion, and a virtual image generated by the viewpoint conversion is referred to as a viewpoint conversion image.

The viewpoint conversion is performed through coordinate conversion to look down a road surface from the above assuming that the image I including the road surface obtained by a camera disposed in a position having a known relationship with the road surface includes the road surface. The obtained image I is converted into the viewpoint conversion image to distinguish a planar object and a three-dimensional object with the use of a principle in which a vertical edge specific to a three-dimensional object is converted into a straight light group passing through a particular fixed point by viewpoint conversion. In addition, the viewpoint conversion image converted by the viewpoint conversion is used for the detection of the three-dimensional object based on the after-described edge information.

Next, in step S62, the viewpoint conversion image obtained in the viewpoint convertor 72a is sequentially input to the position alignment unit 72b, and the viewpoint conversion images input at different times are aligned.

Figure 20:
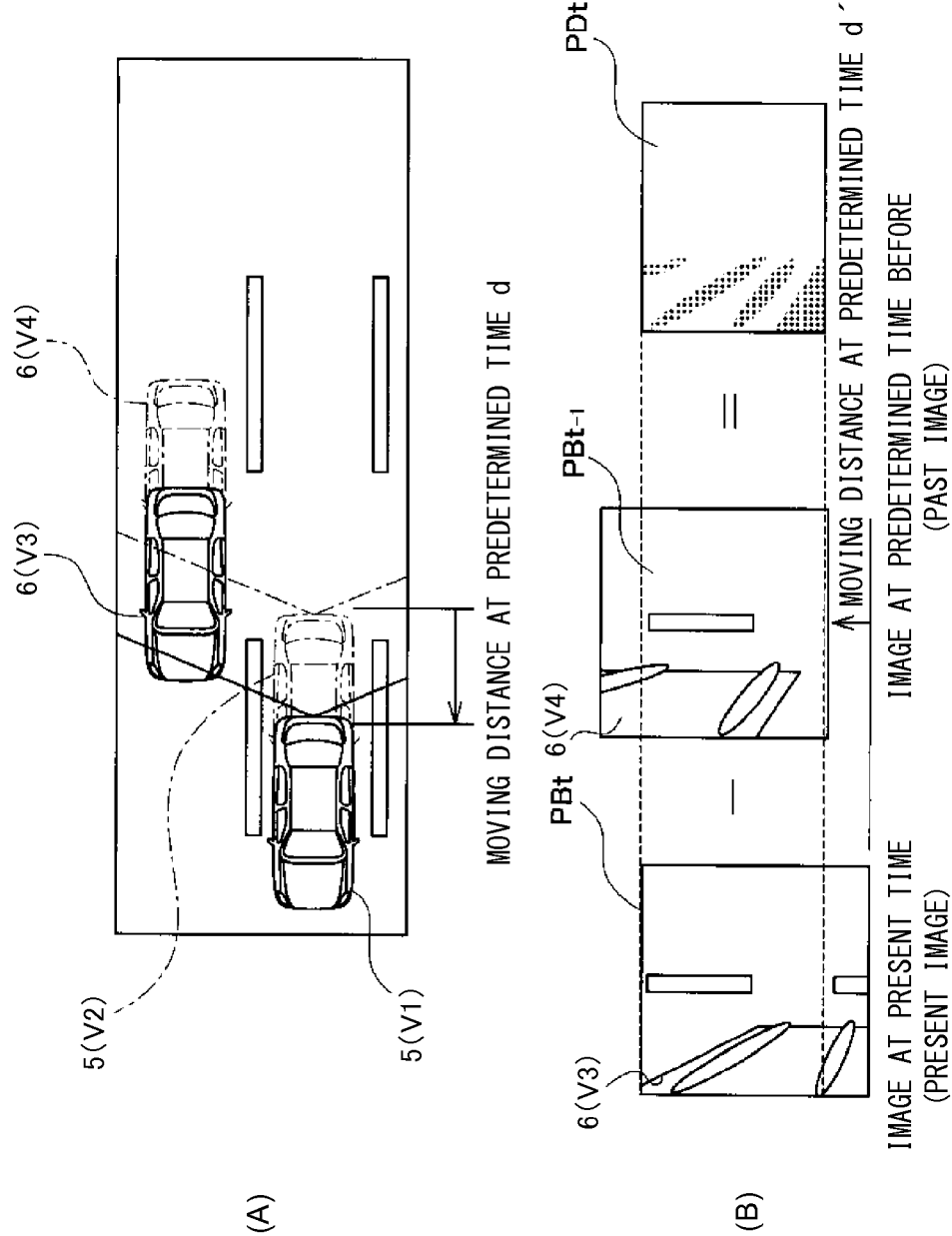
FIGS. 20(A) and 20(B) are views briefly describing a process of aligning viewpoint conversion images, which is executed in Embodiment 1 of the present invention.

FIG. 20(B) are views describing the process which is executed in the position alignment unit 72b. FIG. 20(A) is a plan view illustrating the moving state of the vehicle 5, and FIG. 20(B) is a view briefly describing the alignment.

As illustrated in FIG. 20(A), the vehicle 5 is located in a position V1 at the present time, and the vehicle 5 is located in a position V2 at a predetermined time before. Moreover, the other vehicle 6 is located in the back of the lane close to the lane in which the vehicle 5 travels, the other vehicle 6 is located in a position V3 at the present time, and the other vehicle 6 is located in a position V4 at a predetermined time before. Furthermore, the vehicle 5 moves at a distance d in the predetermined time. The predetermined time before may be a past time for a predetermined time (for example, one control period) from the present time.

In this situation, the viewpoint conversion image $PB_t$ of the present time is as illustrated in FIG. 20(B). In the viewpoint conversion image $PB_t$, a white line on a road surface has a rectangular shape, but a lay-down image occurs in the region of the other vehicle 6 located in the position V3. Similarly, in the viewpoint conversion image $PB_{t-1}$ of the predetermined time before, the white line on the road surface has a rectangular shape, but a lay-down image occurs in the region of the other vehicle 6 located in the position V4.

This is because a vertical edge of a three-dimensional object is converted into a straight line group along the lay-down direction by the viewpoint conversion, but a pattern on a road surface such as a white line does not include the vertical edge, so that such lay-down image does not occur even when the viewpoint conversion is performed.

The position alignment unit 72b aligns the viewpoint conversion image $PB_t$ with the view-point conversion image $PB_{t-1}$ which are generated as described above. In this case, the viewpoint conversion image $PB_{t-1}$ of the predetermined time before is offset by the amount corresponding to a distance where the vehicle 5 moves during the predetermined time, so that the viewpoint conversion image $PB_{t-1}$ is aligned with the viewpoint conversion image $PB_t$ of the present time.

The left side viewpoint conversion image $PB_t$ and the central viewpoint conversion image $PB_{t-1}$ in FIG. 20(B) are offset by the offset amount d'. The offset amount d' is a displacement on the viewpoint conversion image corresponding to the actual moving distance d of the vehicle 5 illustrated in FIG. 20(a), and is determined based on a vehicle speed of the vehicle 5 obtained from the vehicle information-obtaining unit 60 and a time from the predetermined time before to the present time.

Next, in Step S63, after the alignment of the viewpoint conversion images PBt, PBt−1, a difference of these is obtained to generate a difference image $PD_t$. In this case, the brightness value stored in the difference image $PD_t$ may be an absolute value of a difference of the brightness values of the pixels corresponding to the viewpoint conversion images $PB_t$, $PB_{t-1}$, or the brightness value may be set to 1 when the absolute value exceeds a first threshold p and the brightness value may be set to 0 when the absolute value does not exceed the first threshold value, in order to correspond to a change in illuminance environment.

The right image in FIG. 20(b) is the difference image $PD_t$. In addition, the first threshold p is a value set in the close vehicle detector 72 in Step S60 after being corrected in the detection sensitivity adjustor 50. The correction method will be described later.

Next, after Step S64, in the three-dimensional object detector 72c, a three-dimensional object is detected based on the difference image $PD_t$ illustrated in FIG. 20(b). In this case, the three-dimensional object detector 72c also calculates the moving distance of the three-dimensional object.

In order to detect a three-dimensional object and calculate a moving distance, in Step S64, the three-dimensional object detector 72c generates a difference waveform $DW_t$ calculated based on the difference image $PD_t$.

In order to generate the difference waveform $DW_t$, the three-dimensional object detector 72c sets the detection region of the three-dimensional object inside the difference image $PD_t$.

The close vehicle detector 72 detects the other vehicle 6 with which the vehicle 5 may come into contact when the vehicle 5 changes a lane. The other vehicle 6 travels in the lane close to the lane in which the vehicle 5 travels.

Two detection regions are set in the right and left of the vehicle 5 in the image I obtained by the imaging unit 10. In this embodiment, the rectangular detection regions X1, X2 are in the backward of the vehicle 5 in the right and left of the vehicle 5, as illustrated in FIG. 1. The other vehicle 6 detected inside the detection regions X1, X2 is detected as a close vehicle. In addition, such detection regions X1, X2 may be set based on the relative positions to the vehicle 5, or may be set based on a position of a white line on a road. When the detection regions are set based on a position of a white line on a road, the position of the white line detected with the use of a known white line recognition technique, for example, is used as a standard.

The three-dimensional object detector 72c recognizes sides (side along traveling direction of vehicle 5) of the detection regions X1, X2 on the vehicle 5 side as contact lines L1, L2, as illustrated in FIG. 1.

Figure 21:
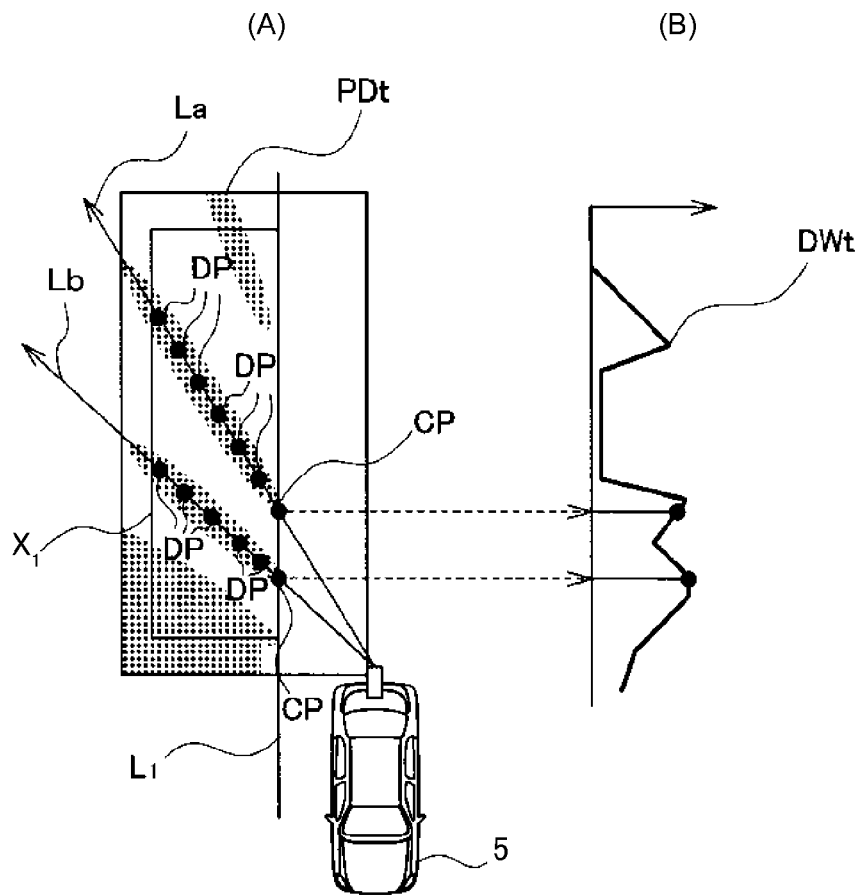
FIGS. 21(A) and 21(B) are views describing generation of a difference waveform based on a difference result of a viewpoint conversion image in Embodiment 1 of the present invention.

FIGS. 21(A), 21(B) are schematic views describing the generation of the difference waveform in the three-dimensional object detector 72c. As illustrated in FIGS. 21(A), 21(B), the three-dimensional object detector 72c generates the difference waveform $DW_t$ from the portions corresponding to the insides of the detection regions X1, X2 in the difference image $PD_t$ (right view of FIG. 20(B)) calculated in the position alignment unit 72b. In this case, the difference waveform $DW_t$ is generated along the lay-down direction of the three-dimensional objet due to the viewpoint conversion. In addition, the example illustrated in FIGS. 21 (A), 21 (B) is described by using only the detection region X1 for the sake of simplicity. However, the difference waveform $DW_t$ is generated with a similar procedure for the detection region X2.

Hereinafter, a method of generating the difference waveform $DW_t$ will be described in detail. At first, the three-dimensional object detector 72c sets a line La along the lay-down direction of the three-dimensional object in the difference image $PD_t$, as illustrated in FIG. 21(A). The number of pixels DP having a difference value of a predetermined value or more is counted on the set line La. In this case, the pixel DP having a difference value of a predetermined value or more (hereinafter referred to as pixel DP) is a pixel exceeding the first threshold value p when the brightness value (pixel value) of the difference image $PD_t$ is obtained by an absolute value of a difference of the brightness values of the viewpoint conversion images $PB_t$, $PB_{t-1}$. The pixel DP is a pixel showing "1" when the brightness value of the difference image $PD_t$ is expressed by "0" and "1".

The three-dimensional object detector 72c obtains an intersection point CP of the line La and the contact line L1 after counting the number of pixels DP having a difference value of the first threshold p or more. Then, the three-dimensional object detector 72c relates the intersection point CP to the counting number of the pixel DP, and determines the horizontal position, namely, the position on the vertical direction axis in FIG. 21(B) based on the position of the intersection point CP and also determines the vertical position, namely, the position on the horizontal direction axis in FIG. 21(B) based on the counting number of the pixel DP. The three-dimensional object detector 72c executes plotting in the intersection point of the determined horizontal axis position and the vertical axis position.

Similarly, the three-dimensional object detector 72c sets lines Lb, Lc ... along the lay-down direction of the three-dimensional object. The three-dimensional object detector 72c counts the number of pixels DP, determines the corresponding horizontal axis position in FIG. 21(B) based on the position of each intersection point CP, determines the vertical axis position from the counting number of the pixel DP, and executes plotting in that position. The difference waveform $DW_t$ illustrated in FIG. 21(B) is therefore generated.

As illustrated in FIG. 21 (A), the lines La, Lb along the lay-down direction of the three-dimensional object differ in a distance direction crossing the detection region X1. When the detection region X1 is filled up with the pixel DP, the counting number of the pixel DP on the line La is larger than the counting number of the pixel DP on the line Lb. The three-dimensional object detector 72c therefore normalizes the counting number of the pixel DP based on the distances that the lines La, Lb along the lay-down direction of the three-dimensional object cross the detection region X1 when the vertical axis position is determined from the counting number of the pixel PD.

For example, in FIG. 21(A), the counting number of the pixel DP on the line La is 6, and the counting number of the pixel DP on the line Lb is 5. The three-dimensional object detector 72c therefore normalizes the counting number by dividing the counting number with the crossing distance, so as to determine the vertical axis position from the counting number in FIG. 21(a).

After that, in Step S65, in the three-dimensional object detector 72c, it is determined whether or not the peak of the difference waveform $DW_t$ generated in Step S64 is a second threshold α or more. The second threshold α is a value previously set to the close vehicle detector 72 in Step S60 after being corrected in the detection sensitivity adjustor 50. The correction method will be described later.

In this case, when the peak of the difference waveform $DW_t$ is not the second threshold α or more, namely, the difference value is very small, it is determined that the three-dimensional object does not exist in the image I. When it is determined that the peak of the difference waveform $DW_t$ is not the second threshold α or more (No in Step S65), the process moves to Step S74. In Step S74, it is determined that the three-dimensional object, namely, the other vehicle 6 does not exist and the vehicle detection process in FIG. 25 is completed, and then, the process returns to the main routine (FIG. 7).

On the other hand, when it is determined that the peak of the difference waveform $DW_t$ is the second threshold α or more (YES in Step S65), the three-dimensional object detector 72c determines the existence of the three-dimensional object, and compares the difference waveform $DW_t$ of the present time and the difference waveform $DW_{t-1}$ of the predetermined time before to calculate a moving distance of the three-dimensional object.

Figure 22:
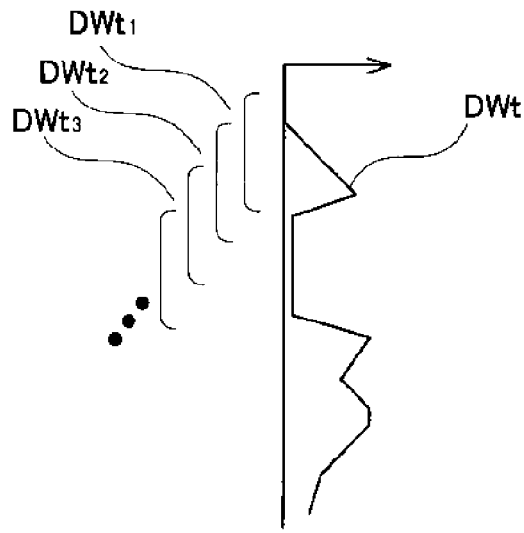
FIG. 22 is a view illustrating a small region divided in a three-dimensional object detector in Embodiment 1 of the present invention.

In Step S66, in the three-dimensional object detector 72c, as illustrated in FIG. 22, the difference waveform $DW_t$ is divided into a plurality of small regions $DW_{t1}$ to $DW_{tn}$ (n is arbitrary integral number of 2 or more). In this case, the small regions $DW_{t1}$ to $DW_{tn}$ are divided to be overlapped with each other, as illustrated in FIG. 22. Namely, in FIG. 22, the small region $DW_{t1}$ and the small region $DW_{t2}$ are overlapped, and the small region $DW_{t2}$ and the small region $DW_{t3}$ are overlapped.

Next, in Step S68, the three-dimensional object detector 72c obtains the offset amount (displacement of difference waveform in horizontal axis direction (vertical direction in FIG. 21(b))) with respect to each of the divided small regions $DW_{t1}$ to $DW_{tn}$. The offset amount is obtained from the difference (distance in horizontal axis direction) between the difference waveform $DW_{t-1}$ of the predetermined time before and the difference waveform $DW_t$ of the present time.

More specifically, a position where an error between the difference waveform $DW_{t-1}$ of the predetermined time before and the difference waveform $DW_t$ of the present time becomes minimum when the difference waveform $DW_{t-1}$ of the predetermined time before is moved in the horizontal axis direction (vertical direction in FIG. 21(b)) is determined with respect to each of the small regions $DW_{t1}$ to $DW_{tn}$, and the displacement in the horizontal axis direction of the original position of the difference waveform $DW_{t-1}$ and the position where the error becomes minimum is obtained as the offset amount.

In Step S69, the three-dimensional object detector 72c generates a histogram by counting the offset amount obtained with respect to each of the small regions $DW_{t1}$ to $DW_{tn}$. In this case, each of the small regions $DW_{t1}$ to $DW_{tn}$ is previously weighted, and the offset amount obtained with respect to each of the small regions $DW_{t1}$ to $DW_{tn}$ is counted according to the weighting to obtain a histogram.

For example, when the small region $DW_{t1}$ is a region having no brightness change, namely, the difference between the maximum value and the minimum value of the counting number of the pixel DP is small, the coefficient of the weighting amount is decreased. This is because the small region $DW_{ti}$ having no brightness change has no feature, so that an error may be increased for calculating the offset amount.

On the other hand, when the small region $DW_{ti}$ is a region having a large brightness change, namely, the difference between the maximum value and the minimum value of the counting number of the pixel PD is large, the coefficient of the weighting amount is increased. This is because the small region $DW_{ti}$ having a large brightness change has a feature, so that the offset amount may be accurately calculated. By weighting as described above, the calculation accuracy of the moving distance can be improved.

Figure 23:
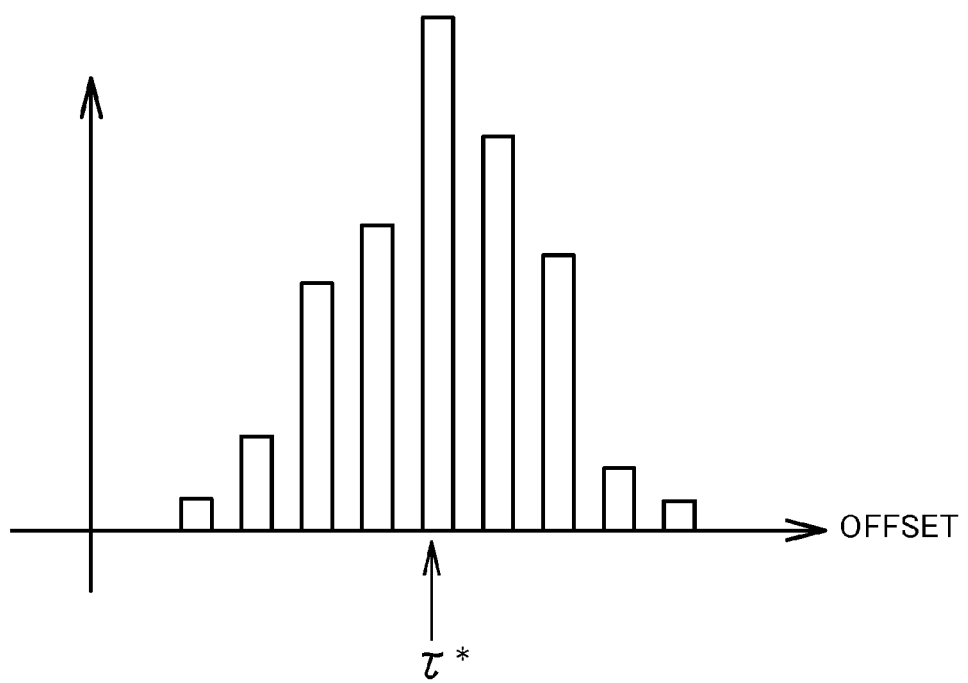
FIG. 23 is a view illustrating one example of a histogram which is obtained in the three-dimensional object detector in Embodiment 1 of the present invention.

FIG. 23 is a view illustrating one example of the histogram generated in Step S69. As illustrated in FIG. 23, the offset amount in which the error between each small region $DW_{t1}$ to $DW_{tn}$ and the difference waveform $DW_{t-1}$ of the predetermined time before is minimum varies.

Next, in Step S70, in the three-dimensional object detector 72c, a relative moving distance $\tau^*$ which is a moving distance of a three-dimensional object is calculated based on the position where the maximum value of the histogram is applied.

In the example of the histogram illustrated in FIG. 23, the offset amount showing the maximum value of the histogram is calculated as the relative moving distance $\tau^*$. This relative moving distance $\tau^*$ is a relative moving distance of the other vehicle 6 to the vehicle 5.

Next, in Step S71, in the three-dimensional object detector 72c, an absolute moving speed of the three-dimensional objet is calculated from the relative moving distance. In this case, the relative moving distance is time-differentiated to calculate the relative moving distance, and the vehicle speed obtained in the vehicle information-obtaining unit 60 is added to calculate the absolute moving speed.

In addition, in order to improve the calculation accuracy of the moving distance, the difference waveform $DW_t$ is divided into a plurality of small regions $DW_{t1}$ to $DW_{tn}$ as described above. However, when high calculation accuracy of the moving distance is not requested, it is not necessary to divide the difference waveform $DW_t$ into a plurality of small regions $DW_{t1}$ to $DW_{tn}$. In this case, the three-dimensional object detector 72c calculates the moving distance from the offset amount of the difference waveform $DW_t$ when the error between the difference waveform $DW_t$ and the difference waveform $DW_{t-1}$ becomes minimum. That is, a method of obtaining the offset amount of the difference waveform $DW_{t-1}$ of the predetermined time before and the difference waveform $DW_t$ of the present time is not limited to the above description.

Next, in Step S72, in the three-dimensional object detector 72c, it is determined whether or not the absolute moving speed of the three-dimensional object is within a predetermined speed range or not. A previously set value is used for the predetermined speed range. When the absolute moving speed of the three-dimensional object is within the predetermined speed range (YES in step S72), the process moves to Step S73. It is determined that the three-dimensional object is the other vehicle 6 in Step S73, and then, the process returns to the main routine (FIG. 7).

On the other hand, when the absolute moving speed of the three-dimensional object is not within a predetermined speed range (NO in Step S72), the process moves to Step S74. In Step S74, it is determined that the three-dimensional object, namely, the other vehicle 6 does not exist, the vehicle detection process of FIG. 25 is completed, and then, the process returns to the main routine (FIG. 7).

In this case, a method of correcting the first threshold p and the second threshold α will be described with reference to FIG. 24. FIG. 24(A) is a view illustrating a method of correcting the first threshold p according to the grime level of the lens 12. FIG. 24(B) is a view illustrating a method of correcting the second threshold α according to the grime level of the lens 12.

A method of correcting the first threshold p will be described with reference to FIG. 24(A). When there is no grime on the lens 12, the first threshold p is set to a predetermined value $p_0$ in the detection sensitivity adjustor 50. The horizontal axis in FIG. 24(A) illustrates the white turbidity level U of the lens 12 calculated in the white turbidity level calculator 25, and illustrates that the white turbidity level U becomes higher toward the right side.

The first threshold p is corrected to be small when the white turbidity level U is high. By correcting the first threshold p to be small, the detection sensitivity of the vehicle is increased. In this case, the first threshold p is corrected such that the lowering level is controlled according to the attachment level M of the attached matter such as dirt or water drops to the lens 12 calculated in the attachment level calculator 26.

More specifically, as illustrated in FIG. 24(A), when there is attached matter (dotted line), the lowering amount of the value of the first threshold p is set to be small even when the white turbidity level of the lens 12 becomes higher, compared to a condition without having attached matter (solid line).

The value of the first threshold p corrected as described above is set to the close vehicle detector 72, and is used for the vehicle detection process. In the vehicle detection process, when the white turbidity level U of the lens 12 is high, the detection sensitivity is increased. Then, when a small difference value is detected in the difference image $PD_t$, that point is detected as a candidate of a three-dimensional object (another vehicle). However, when the lens 12 has attached matter, an increase in detection sensitivity is controlled. Then, when a larger difference value is not detected in the difference image $PD_t$, it is not detected as a candidate of a three-dimensional object.

The second threshold α is corrected with the same method as the first threshold p. Namely, when there is no grime on the lens 12, the second threshold α set to a predetermined value $\alpha_0$ is corrected according to the attachment level M of the attached matter such as dirt or water drops to the lens 12 calculated in the attachment level calculator 26, as illustrated in FIG. 24(B). When the white turbidity level U of the lens 12 is high, the detection sensitivity is increased. Then, when a small peak is detected in the difference waveform $DW_t$, that point is detected as a candidate of a three-dimensional object (another vehicle). When there is attached matter on the lens 12, an increase in detection sensitivity is controlled. Then, when a larger peak is not detected in the difference waveform $DW_t$, it is not detected as a candidate of a three-dimensional object.

As illustrated in FIGS. 24(A), 24(B), an example of linearly correcting the first and second thresholds p, α according to the white turbidity level U. However, the method of correcting the first and second thresholds p, α is not limited thereto. That is, for example, the first and second thresholds p, α are stepwisely corrected according to the white turbidity level U.

A method of correcting the vehicle detection sensitivity (first and second thresholds p, α) may be changed for nighttime and daytime. Namely, the nighttime control amount of the vehicle detection sensitivity (first and second threshold p, α) according to the white turbidity level U of the lens 12 is reduced relative to the daytime control amount, so that a close vehicle can be further effectively detected. In addition, the nighttime and the daytime are determined based on the value of the gain adjusted in the gain adjustor 16 as described above. When the value of the gain is a predetermined value is more, it is determined as nighttime. When the value of the gain is less than a predetermined value, it is determined as daytime.

The relative speed of the close vehicle is calculated based on the vehicle speed of the vehicle 5 and the absolute moving speed of the detected three-dimensional object (close vehicle), and a method of correcting the vehicle detection sensitivity (first and second thresholds p, α) may be set according to the calculated relative speed. That is, when the calculated relative speed includes a positive value of a predetermined threshold or more, namely, when the vehicle 5 is passed by a close vehicle from the backward, the control amount of the vehicle detection sensitivity (first and second thresholds) according to the white turbidity level U of the lens 12 is reduced, and the close vehicle can be further effectively detected.

<<Detection of Three-Dimensional Object Based on Edge Information>>

Next, the detection block A2 of a three-dimensional object with the use of the edge information, which includes the brightness difference calculator 72g, edge line detector 72h, and three-dimensional object detector 72i will be described. The detection block A2 can be operated instead of the detection block A1 illustrated in FIG. 6.

Figure 26:
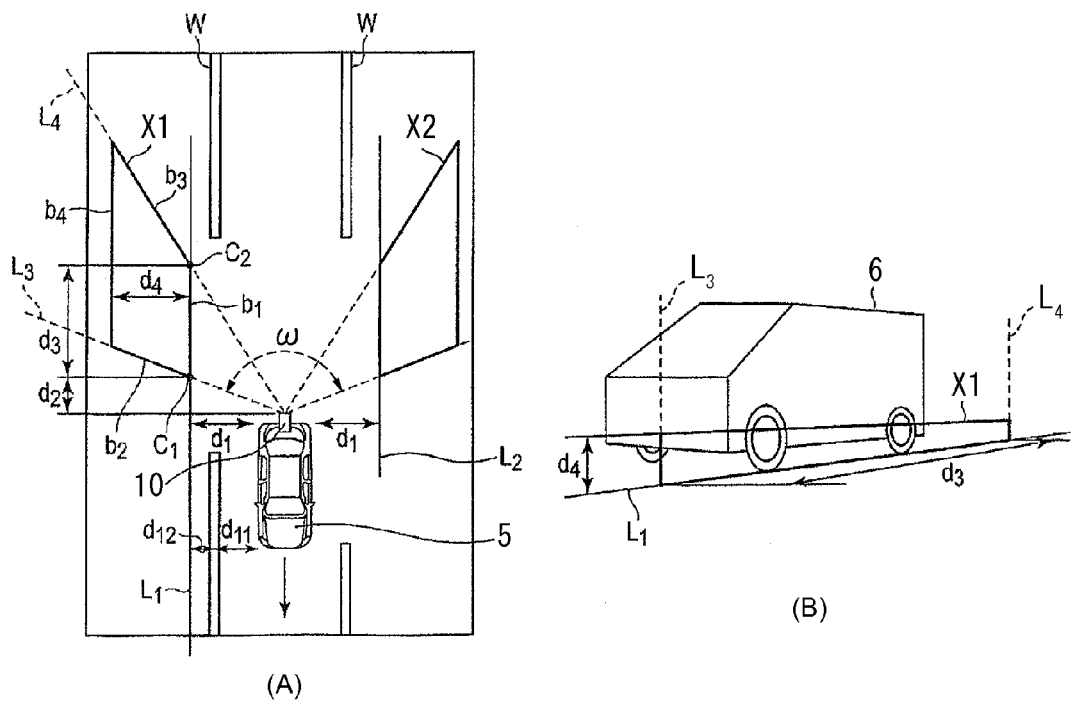

FIG. 26 is a view illustrating an imaging range of the imaging unit 10. FIG. 26(A) is a plan view, and FIG. 26(B) is a perspective view of a real space in the backward of the vehicle 5. As illustrated in FIG. 26(a), the imaging unit 10 images a predetermined range ω in the backward of the vehicle 5.

The detection regions X1, X2 of the present embodiment include a trapezoidal shape in the viewpoint conversion image. The position, size, and shape of the detection regions X1, X2 are determined based on distances d1 to d4. In addition, the detection regions X1, X2 are not limited to a trapezoidal shape, and may be another shape such as a rectangular in the viewpoint conversion image.

In this case, the distance d1 is a distance from the vehicle 5 to contact lines L1, L2. The contact lines L1, L2 are lines that the three-dimensional object in the lane close to the lane in which the vehicle 5 travels has contact with the ground. This embodiment aims to detect the other vehicle 6 traveling in the lane close to the lane of the vehicle 5 in the backward of the vehicle 5. The distance d1 to the positions which are the contact lines L1, L2 of the other vehicle 6 is therefore substantially fixedly determined from the distance d11 from the vehicle 5 to the white line W and the distance d12 from the white line W to the position where the other vehicle 6 is expected to travel.

The distance d2 is a distance extending along the vehicle traveling direction from the back end portion of the vehicle 5. The distance d2 is determined such that the detection regions X1, X2 fall at least in the imaging range of the imaging unit 10. The distance d3 is a distance indicating a length of the detection regions X1, X2 in the vehicle traveling direction. The distance d3 is determined based on the size of the three-dimensional object which is a detection object. In this embodiment, since the detection target is the other vehicle 6, the distance d3 is set to a length including the other vehicle 6.

The distance d4 is a distance indicating a height set to include a tire of the other vehicle 6 in the real space, as illustrated in FIG. 26(B). The distance d4 is a length of a portion illustrated in FIG. 26(A) in the viewpoint conversion image. In addition, the distance d4 may be a length without including a lane (namely, lane next to close lane) close to the right and left close lanes in the viewpoint conversion image.

The distances d1 to d4 are determined as described above, and the position, size and shape of the detection regions X1, X2 are thereby determined. More specifically, the position of an upper base b1 of the trapezoidal detection regions X1, X2 is determined by the distance d1. A starting point C1 of the upper base b1 is determined by the distance d2. An ending position C2 of the upper base b1 is determined by the distance d3. A side b2 of the trapezoidal detection regions X1, X2 is determined by a line L3 extending toward the starting point C2 from the imaging unit 10. Similarly, a side b3 of the trapezoidal detection regions X1, X2 is determined by a straight line L4 extending toward the ending position C2 from the imaging unit 10. A lower base b4 of the trapezoidal detection regions X1, X2 is determined by the distance d4.

The region surrounded by the sides b1 to b4 is set as the detection region X1. The detection region X1 has a regular square (rectangular) in real space in the backward of the vehicle 5, as illustrated in FIG. 26(b). The detection region X2 has a shape similar to that of the detection region X1 although it is not illustrated in FIG. 26(b).

The brightness difference calculator 72g illustrated in FIG. 6 calculates a brightness difference relative to the viewpoint conversion image, by the viewpoint convertor 72a, in order to detect the edge of the three-dimensional object in the viewpoint conversion image. The brightness difference calculator 72g calculates a brightness difference between adjacent two pixels in each position with respect to each of a plurality of positions along the vertical virtual line extending in the vertical direction in the real space. The brightness difference calculator 72g calculates the brightness difference by a method of setting only one vertical virtual line extending in the vertical direction in the real space or a method of setting two vertical virtual lines.

A specific method of setting two vertical virtual lines will be described. The brightness difference calculator 72g sets a first vertical virtual line corresponding to a line segment extending in the vertical direction in the real space and a second vertical virtual line corresponding to the line segment extending in the vertical direction in the real space different from the first vertical virtual line relative to the viewpoint conversion image. The brightness difference calculator 72g continuously obtains the brightness difference between the point on the first vertical virtual line and the point on the second vertical virtual line along the first vertical virtual line and the second vertical virtual line. Hereinafter, the operation of the brightness difference calculator 72g will be described in detail.

Figure 27:
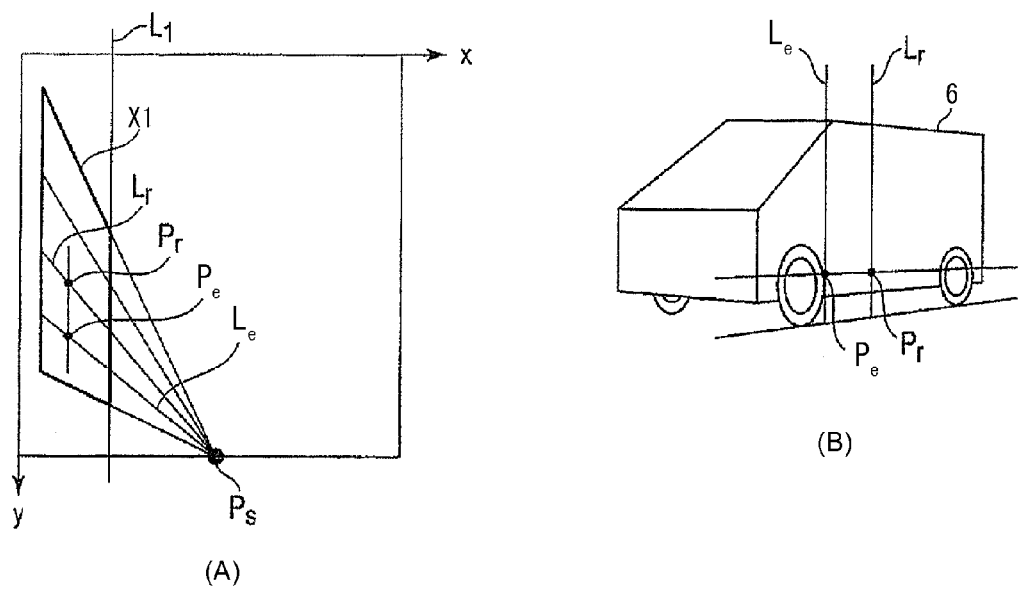
FIGS. 27(A) and 27(B) are views describing an operation of a brightness difference calculator.

The brightness difference calculator 72g sets a first vertical virtual line Le (hereinafter referred to as attention line Le) which corresponds to a line segment extending in the vertical direction in the real space, and passes through the detection region X1, as illustrated in FIG. 27(A). The brightness difference calculator 72g sets a second vertical virtual line Lr (hereinafter referred to as reference line Lr) different from the attention line Le, which corresponds to a line segment extending in the vertical direction in the real space, and passes through the detection region X1. The reference line Lr is set in a position apart from the attention line Le at a predetermined distance in the real space. In addition, the line corresponding to the line segment extending in the vertical direction in the real space radically expands from a position Ps of the imaging unit 10 in the viewpoint conversion image.

The brightness difference calculator 72g sets an attention point Pe (point on first vertical virtual line) on the attention line Le. The brightness difference calculator 72g also sets a reference point Pr on the reference line Lr (point on second vertical virtual line). These attention line Le, attention point Pe, reference line Lr, and reference point Pr have a relationship as illustrated in FIG. 27(B). Namely, the attention line Le and the reference line Lr extend in the vertical direction in the real space. The attention point Pe and the reference point Pr are set substantially at the same height in real space.

The brightness difference calculator 72g obtains a brightness difference between the attention point Pe and the reference point Pr. When the brightness difference between the attention point Pe and the reference point Pr is large, it is considered that an edge exists between the attention point Pe and the reference point Pr. The edge line detector 72h in FIG. 6 detects an edge line based on the brightness difference between the attention point Pe and the reference point Pr.

Figure 28:
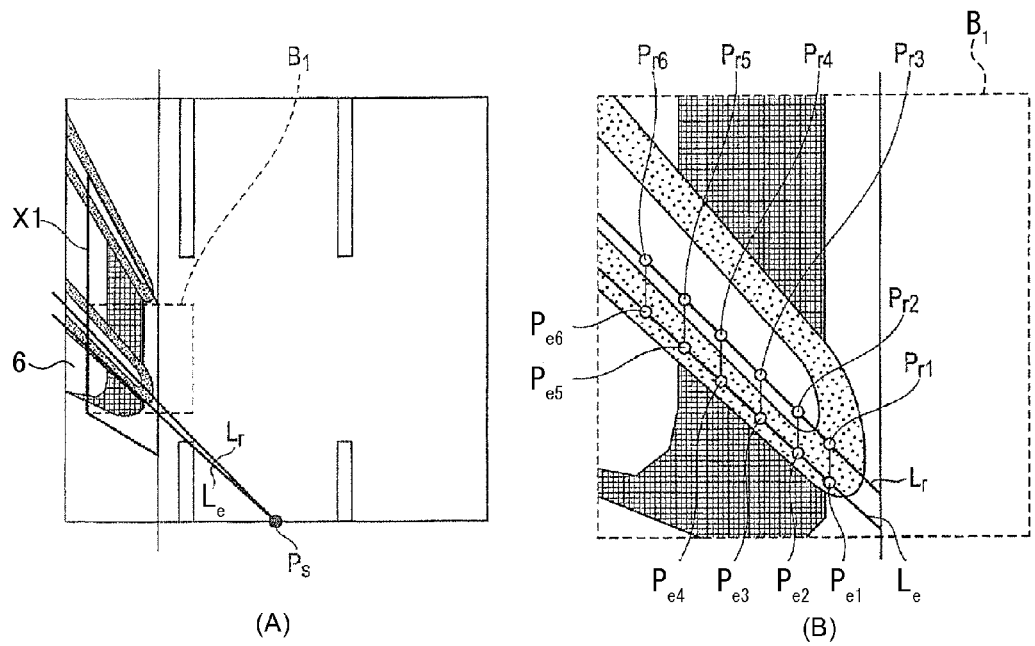
FIGS. 28(A) and 28(B) are views describing a detailed operation of the brightness difference calculator.

This will be described in detail. FIG. 28 is a view illustrating the detailed operation of the brightness difference calculator 72g. FIG. 28(A) illustrates a viewpoint conversion image, and FIG. 28(B) illustrates a view in which a part B1 of the viewpoint conversion image in FIG. 28(A) is enlarged. In addition, in FIG. 28, the detection region X1 is only described, but the brightness difference can calculated for the detection region X2 with the procedure similar to that of the detection region X1.

When the image I obtained by the imaging unit 10 includes the other vehicle 6, as illustrated in FIG. 28(A), the other vehicle 6 appears in the detection region X1 of the viewpoint conversion image. As illustrated in FIG. 28(B), the attention line Le is set on the rubber portion of the tire of the other vehicle 6 in the viewpoint conversion image. With this condition, the brightness difference calculator 72g sets the reference line Lr at first. The reference line Lr is set in a position a predetermined distance apart from the attention line Le in the real space along the vertical direction.

In particular, in the close vehicle detector 72, the reference line Lr is set in a position, for example, 10 cm apart from the attention line Le in real space. The reference line Lr is thereby set on the wheel of the tire of the other vehicle 6, for example, about 10 cm apart from the rubber of the tire of the other vehicle 6.

Next, the brightness difference calculator 72g sets a plurality of attention points Pe1 to PeN on the attention line Le. In FIG. 28(b), six attention points Pe1 to Pe6 (hereinafter simply referred to as Pei in the case of indicating an arbitrary point) are set for the sake of the description. In addition, the number of attention points to be set on the attention line Le can be freely determined. In the following description, a total of N attention points Pe is set on the attention line Le.

Next, the brightness difference calculator 72g sets reference points Pr1 to PrN so as to have the same heights as the attention points Pe1 to PeN in the real space. The brightness difference calculator 72g calculates the brightness difference between the attention point Pe and the reference point Pr having the same height. The brightness difference calculator 72g thereby calculates the brightness difference of the two pixels with respect to a plurality of positions along the vertical virtual line extending in the vertical direction in real space.

More specifically, the brightness difference calculator 72g calculates the brightness difference between the first attention point Pe1 and the first reference point Pr1, for example, and calculates the brightness difference between the second attention point Pe2 and the second reference point Pr2. The brightness difference calculator 72g thereby continuously obtains the brightness difference along the attention line Le and the reference line Lr.

The brightness difference calculator 72g repeats the setting of the reference line Lr, the setting of the attention point Pe and the reference point Pr, and the calculating of the brightness difference while shifting the attention line Le in the detection region X1. More specifically, the brightness difference calculator 72g repeats the above processes while changing the positions of the attention line Le and the reference line Lr at the same distance in the extending direction of the contact line L1 in the real space. The brightness difference calculator 72g sets the line as the reference line Lr in the previous process to the attention line Le, and sets the reference line Lr to the attention line Le, so as to continuously obtain the brightness difference.

Referring to FIG. 6, the edge line detector 72h detects an edge line from the continuous brightness differences calculated in the brightness difference calculator 72g. For example, in FIG. 28(b), the first attention point Pe1 and the first reference point Pr1 are located in the same tire portion, so that the brightness difference between these points is small. On the other hand, the second to sixth attention points Pe2 to Pe6 are located in the rubber portion of the tire, and the second to sixth reference points Pr2 to Pr6 are located in the wheel portion of the tire. The brightness difference between the second to sixth attention points Pe2 to Pe6 and the second to sixth reference points Pr2 to Pr6 is therefore large. Thus, the edge line detector 72h can detect the existence of the edge line between the second to sixth attention points Pe2 to Pe6 and the second to sixth reference points Pr2 to Pr6 having a large brightness difference.

In particular, in order to detect the edge line, the edge line detector 72h applies an attribute s to i-th attention point Pei based on the brightness difference between i-th attention point Pei (coordinate (xi, yi)) and i-th reference point Pri (coordinate (xi', yi')) in accordance with three rules shown in the following Equation 5.

$$s(xi,yi)=1 \text{ where } I(xi,yi)>I(xi',yi')+w,$$

$$s(xi,yi)=-1 \text{ where } I(xi,yi)<I(xi',yi')-w, \text{ and}$$

$$s(xi,yi)=0 \text{ for a condition other than described above.} \quad \text{Equation 5:}$$

In Equation 5, w denotes a third threshold, I (xi, yi) denotes the brightness value of the i-th attention point Pei, and I (xi', yi') denotes the brightness value of the i-th reference point Pri. According to Equation 5, when the brightness value of the attention point Pei is higher than the brightness value in which the third threshold w is added to the reference point Pri, the attribute s (xi, yi) of the attention point Pei is 1. On the other hand, when the brightness value of the attention point Pei is lower than the brightness value in which the third threshold w is reduced from the reference point Pri, the attribute s (xi, yi) of the attention point Pei is −1. When the brightness value of the attention point Pei and the brightness value of the reference point Pri has a relationship other than listed above, the attribute s (xi, yi) of the attention point Pei is 0. The third threshold w is set in the close vehicle detector 72 after being corrected in the detection sensitivity adjustor 50. The correction method will be described later.

Next, the edge line detector 72h calculates a continuousness c (xi, yi) of the attribute s along the attention line Le based on the two rules shown in Equation 6.

$$c(xi,yi)=1 \text{ where } s(xi,yi)=s(xi+1,yi+1), \text{ and}$$

$$c(xi,yi)=0 \text{ for a condition other than described above} \quad \text{Equation 6:}$$

When the attribute s (xi, yi) of the attention point Pei is the same as the attribute s (xi+1, yi+1) of the attention point Pei+1 close to the attribute s (xi, yi), the continuousness c (xi, yi) is 1. When the attribute s (xi, yi) of the attention point Pei is not the same as the attribute s (xi+1, yi+1) of the attention point Pei+1 close to the attribute s (xi, yi), the continuousness is 0.

Next, the edge line detector 72h obtains a sum of the continuousness c of all attention points Pe on the attention line Le. The edge line detector 72h divides the sum of the obtained continuousness c with a sum N of the attention point Pe to normalize the continuousness c. When the normalized continuousness c exceeds a fourth threshold θ, the edge line detector 72h determines the attention line Le as the edge line. In addition, the fourth threshold θ is set in the close vehicle detector 72 after being corrected in the detection sensitivity adjustor 50. The correction method will be described later.

Namely, the edge line detector 72h determines whether or not the attention line Le is an edge line based on Formula 7. The edge line detector 72h determines whether or not all of the attention lines Le on the detection region X1 is an edge line.

$$\Sigma c(xi,yi)/N > \theta \quad \text{Formula 7:}$$

Referring to FIG. 6, the three-dimensional object detector 72i detects a three-dimensional object based on the amount of edge line detected in the edge line detector 72h. As described above, the close vehicle detector 72 detects the edge line extending in the vertical direction in real space. When many edge lines extending in the vertical direction are detected, there is a high possibility that the three-dimensional object exists in the detection regions X1, X2. The three-dimensional object detector 72i therefore detects a three-dimensional object based on the amount of edge lines detected in the edge line detector 72h. The three-dimensional object detector 72i determines whether or not the edge line detected in the edge line detector 72h is correct prior to the detection of the three-dimensional object. The three-dimensional object detector 72i determines whether or not a brightness change along the edge line of the viewpoint conversion image on the edge line is larger than a predetermined threshold. When the brightness change of the viewpoint conversion image on the edge line is larger than a predetermined threshold, it is determined that the edge line is detected by false determination. On the other hand, when the brightness change of the viewpoint conversion image on the edge line is not larger than the predetermined threshold, it is determined that the edge line is a correct line. In addition, this predetermined threshold is previously set by experiments or the like.

Figure 29:
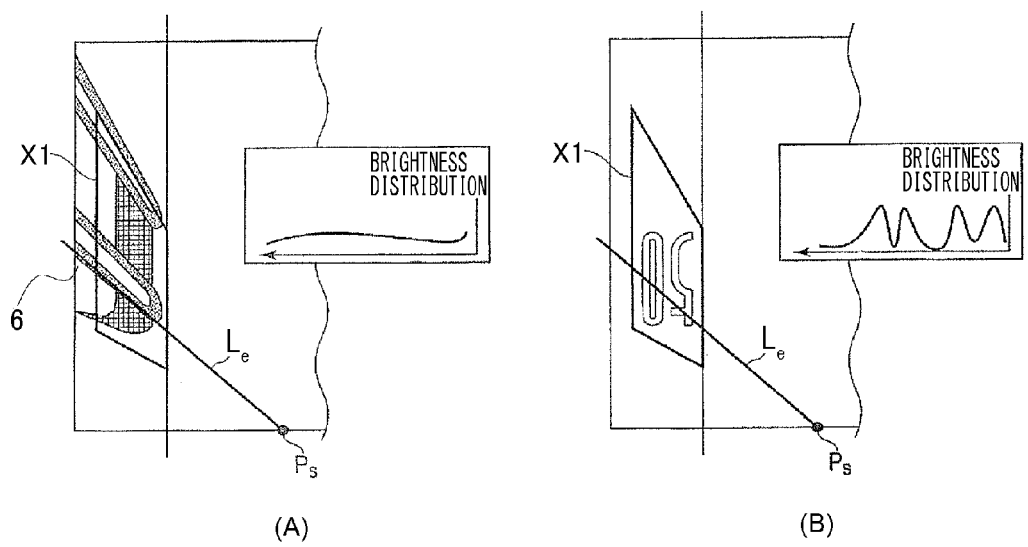
FIGS. 29(A) and 29(B) are views illustrating an edge line and a brightness distribution on the edge line.

FIG. 29 is a view illustrating a brightness distribution of an edge line. FIG. 29(A) is an edge line and a brightness distribution when the other vehicle 6 as a three-dimensional object exists in the detection region X1, and FIG. 29(B) illustrates an edge line and a brightness distribution when a three-dimensional object does not exist in the detection region X1.

As illustrated in FIG. 29(A), when it is determined that the attention line Le set in the rubber portion of the tire of the other vehicle 6 is an edge line in the viewpoint conversion image, the brightness change of the viewpoint conversion image on the attention line Le is smooth. This is because the tire of the other vehicle 6 expands in the viewpoint conversion image by the viewpoint conversion of the image I obtained by the imaging unit 10.

On the other hand, as illustrated in FIG. 29(B), when it is false-determined that the attention line Le set in a white character portion as "50" drawn on a road surface in the viewpoint conversion image is the edge line, the brightness change of the viewpoint conversion image on the attention line Le is large. This is because both of the high brightness portion in the white character and the low brightness portion in the road surface exist on the edge line.

The three-dimensional detector 72i determines whether or not the edge line is detected by false-determination based on the difference in brightness distribution on the attention line Le as described above. The three-dimensional detector 72i determines that the edge line is detected by false-determination when the brightness change along the edge line is larger than a predetermined threshold. The edge line is not used for the detection of the three-dimensional object. A deterioration in detection accuracy of a three-dimensional object due to the determination of weed on a road-side, a white character as "50" on a road surface, or the like as the edge line is controlled.

The three-dimensional object detector 72i calculates the brightness change of the edge line by Equation 8 or Equation 9. The brightness change of the edge line corresponds to an evaluation value in the vertical direction in the real space. Equation 8 evaluates a brightness distribution with a total value of a square of a difference between the i-th brightness value I (xi, yi) on the attention line Le and the close i+1$^{st}$ brightness value I (xi+1, yi+1). Equation 9 evaluates a brightness distribution with a total value of an absolute value of a difference between the i-th brightness value I (xi, yi) on the attention line Le and the close i+1$^{st}$ brightness value I (xi+1, yi+1).

$$\text{Evaluation value of vertical correspondence direction} = \Sigma[\{I(xi,yi)-I(xi+1,yi+1)\}^2] \quad \text{Equation 8:}$$

$$\text{Evaluation value of vertical correspondence direction} = \Sigma|I(xi,yi)-I(xi+1,yi+1)| \quad \text{Equation 9:}$$

In addition, the attribution b of the close brightness value is binarized by using a threshold t2 as Equation 10 without limiting to Equations 8, 9, and the binarized attribution b can be summed for all attention points Pe.

$$\text{Evaluation value of vertical correspondence direction} = \Sigma b(xi,yi), \text{ where } |I(xi,yi)-I(xi+1,yi+1)|>t2, b(xi,yi)=1, \text{ and}$$

$$b(xi,yi)=0 \text{ for a condition other than described above.} \quad \text{Equation 10:}$$

When the absolute value of the brightness difference between the brightness value of the attention point Pei and the brightness value of the reference point Pri is larger than the threshold t2, the attribute b of the attention point Pe (xi, yi) is 1. When the value has a relationship other than listed above, the attribute b (xi, yi) of the attention point Pei is 0. This threshold value t2 is previously set by experiments or the like, so as to determine that the attention line Le is not on the same three-dimensional object. The three-dimensional object detector 72i sums the attributes b for all attention points Pe on the attention line Le, obtains the evaluation value in the vertical correspondence direction, and determines whether or not the edge line is correct.

Here, a method of correcting the third threshold w and the fourth threshold θ will be described with reference to FIG. 30. FIG. 30(A) is a view describing a method of correcting the third threshold w according to the grime level of the lens 12. FIG. 30(B) is a view describing the method of correcting the fourth threshold θ according to the grime level of the lens 12.

At first, the method of correcting the third threshold w will be described with reference to FIG. 30(A). When there is no grime on the lens 12, the third threshold w is set to a predetermined value $w_0$ in the detection sensitivity adjustor 50. The horizontal axis in FIG. 30(A) illustrates the white turbidity level U of the lens 12 calculated in the white turbidity level calculator 25, and indicates that the white turbidity level U becomes higher toward the right side.

The third threshold w is corrected to be small when the white turbidity level U is high. By correcting the third threshold w to be small, the detection sensitivity of the vehicle is increased. In this case, the third threshold w is corrected such that the lowering level is controlled according to the attachment level M of the attached matter such as dirt or water drops to the lens 12 calculated in the attachment level calculator 26.

As illustrated in FIG. 30(A), when there is attached matter (dotted line), the reduced amount of the value of the third threshold w is set to be small even when the white turbidity level of the lens 12 becomes higher, compared to the case without having attached matter (solid line).

The corrected third threshold w is set to the close vehicle detector 72, and is used for the vehicle detection process. In the vehicle detection process, when the white turbidity level U of the lens 12 is high, the detection sensitivity is increased. When the brightness difference between the attention line Le and the reference line Lr set in the viewpoint conversion image is detected, that point is detected as a candidate of the three-dimensional object (another vehicle). When the lens 12 includes attached matter, an increase in detection sensitivity is controlled. When a brightness difference larger than the previous difference is not detected between the attention line Le and the reference line Lr, it is not detected as a candidate of a three-dimensional object.

The fourth threshold θ is corrected with the same idea as the third threshold w. Namely, the fourth threshold θ set to a predetermined value $θ_0$ when the lens 12 does not include grime is corrected according to the attachment level M of the attached matter such as dirt or water drops to the lens 12 calculated in the attachment level calculator 26, as illustrated in FIG. 30(B). When the white turbidity level U of the lens 12 is high, the detection sensitivity is increased, and when the continuousness c of the pixel that the attribute s=1 is high on the attention line Le set in the viewpoint conversion image, the attention line Le is determined as the edge line. When the lens 12 includes attached matter, an increase in detection sensitivity is controlled, and when the continuousness c of the pixel that the attribute s=1 does not reach a value higher than the previous value, it is not detected as an edge line.

In addition, in FIGS. 30(A), 30(B), the example in which the third threshold w and the fourth threshold θ are linearly corrected according to the white turbidity level U is illustrated. However the method of correcting the third threshold w and the fourth threshold θ is not limited thereto. Namely, the third threshold w and the fourth threshold θ may be corrected in a stepwise manner according to the white turbidity level U, for example.

Next, a method of detecting a three-dimensional object with the use of the edge information according to the present embodiment will be described. FIG. 31 is a flowchart illustrating the details of the method of detecting a three-dimensional object according to the present embodiment. In FIG. 31, a process for the detection region X1 is described, but the same process is executed to the detection region X2.

As illustrated in FIG. 31, in Step S80, in the detection sensitivity adjustor 50, the third threshold w and the fourth threshold θ corrected based on the grime level (white turbidity level U and attachment level M) of the lens 12 are set to the close vehicle detector 72.

Next, in Step S81, in the viewpoint convertor 72a, the image I obtained by the imaging unit 10 is converted into a viewpoint conversion image as seen from the above.

In Step S82, the brightness difference calculator 72g sets the attention line Le inside the detection region X1. In this case, the brightness difference calculator 72g sets a line corresponding to a line extending in the vertical direction in the real space as the attention line Le.

In Step S83, the brightness difference calculator 72g sets inside the detection region X1 a line corresponding to a line segment extending in the vertical direction in the real space and a predetermined distance apart from the attention line Le in the real space as a reference line Lr.

Next, in Step S84, the brightness difference calculator 72g sets a plurality of attention points Pe on the attention line Le. In this case, the brightness difference calculator 72g sets some attention points Pe which do not cause a problem in the edge detection in the edge line detector 72h. The brightness difference calculator 72g sets a reference point Pr such that the attention point Pe and the reference point Pr are the substantially same height in the real space in Step S85. The attention point Pe and the reference point Pr are thereby arranged in an approximate horizontal direction, and the edge line extending in the vertical direction is easily detected in the real space.

In Step S86, the brightness difference calculator 72g calculates a brightness difference between the attention point Pe and the reference point Pr of the same height in the real space. The edge line detector 72h calculates the attribute s of each attention point Pe according to the above Equation 5.

In Step S87, the edge line detector 72h calculates the continuousness c of the attribute s of each attention point Pe according to the above Equation 6.

Next, in Step S88, the edge line detector 72h determines whether or not the value in which the sum of the continuousness c is normalized is larger than the fourth threshold θ according to the above Formula 7. When it is determined that the normalized value is larger than the fourth threshold θ (YES in Step S88), the edge line detector 72h detects the attention line Le as the edge line in Step 89. Then, the process moves to Step S90. On the other hand, in Step S88, when it is determined that the normalized value is less than the fourth threshold θ (NO in Step S88), the edge line detector 72h does not detect the attention line Le as the edge line, and the process moves to Step S90.

In Step S90, it is determined whether or not the close vehicle detector 72 executes the processes in Steps S82 to S89 for all of the attention lines Le settable on the detection region X1. When it is determined that the processes are not executed for all of the attention lines Le (NO in Step S90), the process goes back to Step S82, the attention line Le is newly set, and the processes to Step S89 are repeated. On the other hand, when it is determined that the processes are executed for all of the attention lines Le (YES in Step S90), the process moves to Step S91.

Next, in Step S91, the three-dimensional object detector 72i calculates a brightness change along the edge line for each of the edge lines detected in Step S89. The three-dimensional object detector 72i calculates the brightness change of the edge line according to any one of the above Equations 8, 9, 10. Next, the three-dimensional object detector 72i eliminates an edge line whose brightness change is larger than a predetermined threshold in the edge lines in Step S92. Namely, it is determined that the edge line having a large brightness change is not a correct edge line, and the edge line is not used for the detection of the three-dimensional object. This is for controlling the detection of characters on a road surface and weed on a road-side in the detection region X1 as the edge line. A predetermined value is therefore set based on the brightness change generated by characters on a road surface and weed of a road-side previously obtained by experiments or the like.

Next, the three-dimensional object detector 72i determines whether or not the amount of edge lines is a fifth threshold $\beta$ or not in Step S93. The fifth threshold $\beta$ is previously obtained by experiments or the like. For example, when a four-wheel car is set as a detection target, the fifth threshold $\beta$ is set based on the number of edge lines of the four-wheel car appeared in the detection region X1 by experiments or the like. When it is determined that the amount of the edge lines is a fifth threshold $\beta$ or more (YES in Step S93), the three-dimensional object detector 72i determines that there is a three-dimensional object in the detection region X1 in Step S94.

On the other hand, when it is determined that the amount of edge lines is not the fifth threshold $\beta$ or more (NO in Step S93), the three-dimensional object detector 72i determines that there is no three-dimensional object in the detection region X1. After that, the processes illustrated in FIG. 31 are completed, and the process goes back to the main routine (FIG. 7).

In addition, it may be determined that the detected three-dimensional object is the other vehicle 6 traveling on the close lane next to the lane in which the vehicle 5 travels. It may be determined that whether or not the detected three-dimensional object is the other vehicle 6 traveling in the close lane in view of the relative speed to the vehicle 5 of the detected three-dimensional object.

In Embodiment 1, the method of detecting a three-dimensional object (close vehicle) with the use of difference waveform information, and the method of detecting a three-dimensional object (close vehicle) with the use of edge information are described, but the method of detecting a close vehicle is not limited thereto. For example, a three-dimensional object (close vehicle) can be detected through an image process which calculates an optical flow relative to the image I obtained by the imaging unit 10 without executing the viewpoint conversion described in Embodiment 1. In this case, in the detection sensitivity adjustor 50, a threshold for detecting a feature point from a time-series image and a threshold for determining matching upon matching the feature points are corrected according to the attachment level M of the attached matter and the white turbidity level U of the lens 12, so that the other vehicle 6 can be effectively detected.

As described above, according to the in-vehicle image recognizer 8 of one embodiment of the present invention, in the detection sensitivity adjustor 50 which adjusts the detection sensitivity to be increased according to the white turbidity level, the detection sensitivity of the image recognition application execution unit, for example, the vehicle detector 70, which detects a moving object, for example, the other vehicle 6 existing in the surrounding area of the vehicle 5 with a predetermined detection sensitivity from the image obtained by the imaging unit 10 disposed in the vehicle 5 to observe the surrounding area of the vehicle 5 through the lens 12 and convert the light signal of the observed surrounding area of the vehicle 5 into the image signal, is corrected based on the attachment level M of the attached matter such as dirt or water drops to the lens 12, which is calculated by the attachment level calculator 26. With this configuration, even when the attached matter such as dirt or water drops is attached to the lens 12, an excessive increase in detection sensitivity is controlled, and thus, the position of the other vehicle 6 can be effectively detected regardless of the attachment level M of the attached matter or the white turbidity level U of the lens 12.

According to the in-vehicle image recognizer 8 of one embodiment of the present invention, the white turbidity level calculator 22 calculates the white turbidity level U1 of the lens 12 based on at least one of the edge intensity distribution and the brightness gradient of the image obtained by the imaging unit 10. With this configuration, the white turbidity level U of the lens 12 can be stably and effectively calculated regardless of the brightness of the outside of the vehicle 5.

According to the in-vehicle image recognizer 8 of one embodiment of the present invention, the increase of the detection sensitivity of the other vehicle 6 is controlled in the detection sensitivity adjustor 50 when the attachment level M such as the dirt or the water drops to the lens 12 calculated in the attachment level calculator 16 is high. With this configuration, even when it is determined that the white turbidity level U is high along with the high attachment level M, the increase of the detection sensitivity of the other vehicle 6 can be controlled. Thus, the other vehicle 6 can be effectively detected in the image recognition application execution unit, for example, the vehicle detector 70.

According to the in-vehicle image recognizer 8 of one embodiment of the present invention, the detection sensitivity adjustor 50 corrects at least one threshold among the first threshold p for detecting a pixel having a brightness difference from one image obtained by the imaging unit 10, the second threshold $\alpha$ for detecting a pixel having a brightness change in a time-series image obtained at different times by the imaging unit 10, and the threshold for determining matching when matching the detected pixels having the brightness change from the time-series image obtained at different times by the imaging unit 10. With this configuration, even when the lens 12 has grime, the other vehicle 6 can be further effectively detected in the image recognition application execution unit, for example, the vehicle detector 70.

According to the in-vehicle image recognizer 8 of one embodiment of the present invention, the detection sensitivity adjustor 50 corrects at least one of the thresholds, and controls the increase of the detection sensitivity at nighttime compared to daytime when the attachment level M of the attached matter such as the dirt or the water drops to the lens 12 and the white turbidity level U of the lens 12 is high. With this configuration, the nighttime control amount of the vehicle detection sensitivity (for example, first threshold p and second threshold a) according to the white turbidity level U of the lens 12 is reduced relative to the daytime control amount, and thus, the other vehicle 6 can be further effectively detected.

According to the in-vehicle image recognizer 8 of one embodiment of the present invention, the image recognition application execution unit, for example, the vehicle detector 70 detects another vehicle 7 close to the vehicle 5 in a backward of the vehicle 5. With this configuration, the safe condition of the backward can be effectively confirmed when the vehicle 5 changes a lane.

According to the in-vehicle image recognizer 8 of one embodiment of the present invention, the detection sensitivity adjustor 50 controls the increase of the detection sensitivity when the other vehicle 6 is close to the vehicle 5 at a predetermined positive relative speed in the case that the attachment level M of the attached matter such as the dirt or the water drops to the lens 12 and the white turbidity level U of the lens 12 are high. With this configuration, when the relative speed has a positive value of a predetermined value or more, namely, when the vehicle 5 is passed by a close vehicle from the backward, the control amount of the vehicle detection sensitivity (for example, first threshold p and second threshold α) according to the white turbidity level U of the lens 12 is reduced, and thus, the close vehicle can be further effectively detected.

In addition, the image recognition application system which operates concurrently with the in-vehicle image recognizer 8 is not limited to the BSW system 9. Namely, an LDW (Lane Departure Warning) system, which detects the position of a lane marker such as a white line which moves according to the traveling position of the vehicle 5 from the image I obtained by the imaging unit 10, and previously detects lane departure based on the detected position of the lane maker to inform a driver such lane departure, or another system can be applied.

Although the embodiment of the present invention has been described above, the present invention is not limited thereto. It should be appreciated that variations may be made in the embodiment and the aspects described by persons skilled in the art without departing from the scope of the present invention.

CROSS-REFERENCE TO RELATED APPLICATION

The present application is based on and claims priority from Japanese Patent Application No. 2012-167702, filed on Jul. 27, 2012, the disclosure of which is hereby incorporated by reference in its entirety.

DESCRIPTION OF REFERENCE NUMERALS

8 In-vehicle image recognizer
9 BSW system
10 Imaging unit
12 Lens
14 Light convertor
16 Gain adjustor
20 Lens grime detector
22 First white turbidity level calculator
24 Second white turbidity level calculator
25 White turbidity level calculator
26 Attachment level calculator
30 Lens grime level calculator
50 Detection sensitivity adjustor
60 Vehicle information-obtaining unit
70 Vehicle detector
72 Close vehicle detector
74 Alert output unit

The invention claimed is:

1. An in-vehicle image recognizer, comprising:
an imaging unit which is disposed in a vehicle to observe a surrounding area of the vehicle through a lens, and convert a light signal of the observed surrounding area of the vehicle into an image signal;
an image recognition application execution unit having predetermined detection sensitivity to detect a moving object existing in the surrounding area of the vehicle from the image obtained by the imaging unit;
a white turbidity level calculator which calculates a white turbidity level of the lens from the image signal;
an attachment level calculator which calculates an attachment level of attached matter such as dirt or water drops to the lens; and
a detection sensitivity adjustor which adjusts the detection sensitivity to be increased according to the white turbidity level, wherein
the detection sensitivity adjustor corrects the detection sensitivity based on the attachment level of the attached matter such as the dirt or the water drops to the lens.

2. The in-vehicle image recognizer according to claim 1, wherein the white turbidity level calculator calculates the white turbidity level of the lens based on at least one of an edge intensity distribution and a brightness gradient of the image obtained by the imaging unit.

3. The in-vehicle image recognizer according to claim 1, wherein the detection sensitivity adjustor controls an increase of the detection sensitivity when the attachment level such as the dirt or the water drops to the lens calculated in the attachment level calculator is high.

4. The in-vehicle image recognizer according to claim 1, wherein the detection sensitivity adjustor corrects at least one threshold among a threshold for detecting a pixel having a brightness difference from one image obtained by the imaging unit, a threshold for detecting a pixel having a brightness change in a time-series image obtained at different times by the imaging unit, and a threshold for determining matching when matching the detected pixels having the brightness change from the time-series image obtained at different times by the imaging unit.

5. The in-vehicle image recognizer according to claim 1, wherein the detection sensitivity adjustor corrects at least one of the thresholds, and controls the increase of the detection sensitivity at nighttime compared to daytime when the attachment level of the attached matter such as the dirt or the water drops to the lens and the white turbidity level of the lens are high.

6. The in-vehicle image recognizer according to claim 1, wherein the image recognition application execution unit detects another vehicle close to the vehicle in a backward of the vehicle.

7. The in-vehicle image recognizer according to claim 6, wherein the detection sensitivity adjustor controls the increase of the detection sensitivity when another vehicle is close to the vehicle at a predetermined positive relative speed in the case that the attachment level of the attached matter such as the dirt or the water drops to the lens and the white turbidity level of the lens are high.

* * * * *